US012694778B2

(12) United States Patent
Linsmeier et al.

(10) Patent No.: US 12,694,778 B2
(45) Date of Patent: Jul. 28, 2026

(54) VEHICLE SYSTEMS AND METHODS

(71) Applicant: Oshkosh Corporation, Oshkosh, WI (US)

(72) Inventors: Eric Linsmeier, Oshkosh, WI (US); David Archer, Oshkosh, WI (US); Korry Kobel, Oshkosh, WI (US); Fredric Yutzy, Oshkosh, WI (US); Dan Adamson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 155 days.

(21) Appl. No.: 18/641,002

(22) Filed: Apr. 19, 2024

(65) Prior Publication Data

US 2025/0378719 A1 Dec. 11, 2025

Related U.S. Application Data

(60) Provisional application No. 63/625,736, filed on Jan. 26, 2024, provisional application No. 63/543,229, (Continued)

(51) Int. Cl.
*G08B 25/00* (2006.01)
*B60W 50/02* (2012.01)
(Continued)

(52) U.S. Cl.
CPC ....... *G08B 25/009* (2013.01); *B60W 50/0205* (2013.01); *B60W 50/14* (2013.01); *G06V 20/52* (2022.01); *G06V 20/582* (2022.01); *G07C 5/0808* (2013.01); *G08B 25/004* (2013.01); *G08G 1/091* (2013.01); *G08G*

*1/202* (2013.01); *H04W 4/024* (2018.02); *H04W 4/025* (2013.01); *H04W 4/029* (2018.02); *H04W 4/14* (2013.01); *A62C 27/00* (2013.01);
(Continued)

(58) Field of Classification Search
CPC .... G07C 5/0808; G06V 20/52; G06V 20/582; G08G 1/091; A62C 27/00
See application file for complete search history.

(56) References Cited

U.S. PATENT DOCUMENTS 5,791,857 A 8/1998 Ziaylek et al.
6,002,326 A 12/1999 Turner
(Continued)

FOREIGN PATENT DOCUMENTS

WO WO-2019/213485 A1 11/2019

*Primary Examiner* — Michael V Kerrigan
(74) *Attorney, Agent, or Firm* — Foley & Lardner LLP

(57) ABSTRACT

A vehicle system includes a vehicle and processing circuitry. The vehicle includes a chassis, a tractive element coupled to the chassis, a prime mover configured to drive the tractive element to propel the vehicle, and one or more sensors. The processing circuitry is configured to at least one of (a) provide a first notification to a user including information describing a predicted failure, (b) identify, using image data, at least one of an object or an event within the surrounding environment, (c) determine, based on pressure data, a command for a second pump of an upstream vehicle where the second pump is fluidly coupled to an inlet of a first pump of the vehicle, or (d) vary the speed of the first pump in response to receiving a command to vary the speed of the first pump from a downstream vehicle.

18 Claims, 14 Drawing Sheets

Related U.S. Application Data filed on Oct. 9, 2023, provisional application No. 63/461,157, filed on Apr. 21, 2023, provisional application No. 63/461,161, filed on Apr. 21, 2023.

(51) Int. Cl.

| | |
|---|---|
| *B60W 50/14* | (2020.01) |
| *G06V 20/52* | (2022.01) |
| *G06V 20/58* | (2022.01) |
| *G07C 5/08* | (2006.01) |
| *G08G 1/00* | (2006.01) |
| *G08G 1/09* | (2006.01) |
| *H04W 4/02* | (2018.01) |
| *H04W 4/024* | (2018.01) |
| *H04W 4/029* | (2018.01) |
| *H04W 4/14* | (2009.01) |
| *A62C 27/00* | (2006.01) |
| *B60W 50/00* | (2006.01) |

(52) U.S. Cl.
CPC ............... *B60W 2050/0005* (2013.01); *B60W 2050/0215* (2013.01); *B60W 2050/146* (2013.01); *B60W 2556/45* (2020.02)

(56) References Cited

U.S. PATENT DOCUMENTS

| | | | |
|---|---|---|---|
| 9,412,273 | B2 | 8/2016 | Ricci |
| 10,144,389 | B2 | 12/2018 | Archer et al. |
| 10,609,541 | B1 | 3/2020 | Govindassamy |
| 10,650,621 | B1 | 5/2020 | King et al. |
| 10,902,722 | B2 | 1/2021 | Lin |
| 11,396,310 | B2 | 7/2022 | Ito et al. |
| 12,455,194 | B2 * | 10/2025 | Timler ................. G01J 5/0018 |
| 2003/0137194 | A1 * | 7/2003 | White ...................... B60L 3/12 |
| | | | 307/10.1 |
| 2005/0151642 | A1 | 7/2005 | Tupler et al. |
| 2006/0076189 | A1 | 4/2006 | Ziaylek et al. |
| 2009/0143045 | A1 | 6/2009 | Graves et al. |
| 2009/0254240 | A1 * | 10/2009 | Olsen, III ............. G07C 5/008 |
| | | | 701/29.5 |
| 2013/0231072 | A1 | 9/2013 | Anderson et al. |
| 2015/0066557 | A1 | 3/2015 | Lichti |
| 2015/0282061 | A1 | 10/2015 | Matthews et al. |
| 2015/0332581 | A1 | 11/2015 | Gaurav et al. |
| 2018/0137742 | A1 | 5/2018 | Zhang et al. |
| 2019/0222993 | A1 | 7/2019 | Maheshwari et al. |
| 2020/0007540 | A1 | 1/2020 | Kawaguchi et al. |
| 2020/0019894 | A1 | 1/2020 | Jin et al. |
| 2020/0037142 | A1 | 1/2020 | Lofton |
| 2020/0118418 | A1 | 4/2020 | Benjamin |
| 2020/0169967 | A1 | 5/2020 | Yu et al. |
| 2020/0326702 | A1 | 10/2020 | Iwamoto et al. |
| 2021/0009151 | A1 | 1/2021 | Sasaki et al. |
| 2021/0108433 | A1 | 4/2021 | Richardson et al. |
| 2022/0076555 | A1 | 3/2022 | Menard et al. |
| 2023/0141456 | A1 | 5/2023 | Archer et al. |
| 2023/0191993 | A1 * | 6/2023 | Fish ........................ B60Q 9/00 |
| 2023/0225036 | A1 | 7/2023 | Brodsky et al. |
| 2023/0244226 | A1 | 8/2023 | Weslosky et al. |
| 2023/0306832 | A1 | 9/2023 | Khosla et al. |
| 2024/0144750 | A1 | 5/2024 | Bohman et al. |
| 2025/0104001 | A1 | 3/2025 | Liu |
| 2025/0108689 | A1 | 4/2025 | Jones et al. |

* cited by examiner

900

API Value Chain

APIs

Apps

API Provider

API Consumer

End User/Customer

3rd Party Web-Portal

End-user Access

API Value Chain Model Architecture
- API Provider - The company that Creates and Offers an API
- API Consumer or 'Developer' - the Developer who Implements the API
- End User - the Person Utilizing the Application Containing the API (FD Rep/User)

VEHICLE SYSTEMS AND METHODS

CROSS-REFERENCE TO RELATED PATENT APPLICATIONS

This application claims the benefit of and priority to (i) U.S. Provisional Application No. 63/461,157, filed on Apr. 21, 2023, (ii) U.S. Provisional Application No. 63/461,161, filed on Apr. 21, 2023, (iii) U.S. Provisional Application No. 63/543,229, filed on Oct. 9, 2023, and (iv) U.S. Provisional Application No. 63/625,736, filed on Jan. 26, 2024, the entire disclosures of which are hereby incorporated by reference herein.

BACKGROUND

Response vehicles include various features and systems for assisting an operator of the response vehicle in responding to an incident. By way of example, the systems may provide navigation assistance, warning lights, or other information to an operator. However, such systems are limited to providing information at the vehicle, thereby preventing an operator positioned remotely from the vehicle from interacting with the system.

SUMMARY

At least one embodiment relates to a vehicle system including a vehicle and processing circuitry. The vehicle includes a chassis, a tractive element coupled to the chassis, a prime mover configured to drive the tractive element to propel the vehicle, and one or more sensors. The processing circuitry is operatively coupled to the one or more sensors. The processing circuitry may be configured to receive, from a first sensor of the one or more sensors, first sensor data relating to operation of the vehicle, predict a failure of a component of the vehicle based on the first sensor data, and provide a first notification to a user including information describing the predicted failure. The processing circuitry may be configured to receive, from a second sensor of the one or more sensors, image data regarding a surrounding environment of the vehicle, identify, using the image data, at least one of an object or an event within the surrounding environment, and provide a second notification to the user based on the at least one of the object or the event that is identified. The processing circuitry may be configured to receive, from a third sensor of the one or more sensors, pressure data indicating a pressure of a fluid supplied by a first pump of the vehicle, determine, based on the pressure data, a command for a second pump of an upstream vehicle where the second pump is fluidly coupled to an inlet of the first pump of the vehicle, and transmit the command for the second pump to the upstream vehicle. The processing circuitry may be configured to receive, from a downstream vehicle, a command to vary a speed of the first pump where the downstream vehicle includes a third pump that is fluidly coupled to an outlet of the first pump and vary the speed of the first pump in response to receiving the command to vary the speed of the first pump.

Another embodiment relates to a vehicle system including a first vehicle and a second vehicle. The first vehicle includes a first pump having an inlet and an outlet, the first pump being configured to direct fluid from the inlet to the outlet, a pressure sensor configured to measure a pressure of the fluid, and a first processing circuit operatively coupled to the pressure sensor and the first pump. The first processing circuit is configured to transmit a command to increase an amount of the fluid supplied to the inlet in response to a determination that the pressure is below a threshold pressure. The second vehicle includes a second pump fluidly coupled to the inlet of the first pump and configured to supply at least a portion of the fluid to the inlet and a second processing circuit operatively coupled to the second pump. The second processing circuit is configured to control the second pump to increase the amount of the fluid supplied to the inlet of the first pump.

Another embodiment relates to a vehicle system including a vehicle, a first sensor, a second sensor, a third sensor, and processing circuitry operatively coupled to the first sensor, the second sensor, and the third sensor. The processing circuitry is configured to receive, from the first sensor, first sensor data relating to operation of the vehicle, predict a failure of a component of the vehicle based on the first sensor data, and provide a first notification including information describing the predicted failure. The processing circuitry is configured to receive, from the second sensor, image data regarding a surrounding environment of the vehicle, identify, using the image data, at least one of an object or an event within the surrounding environment, and provide a second notification based on the at least one of the object or the event that is identified. The processing circuitry is configured to receive, from the third sensor, pressure data indicating a pressure of a fluid supplied by a first pump of the vehicle, determine, based on the pressure data, a command for a second pump of an upstream vehicle where the second pump is fluidly coupled to an inlet of the first pump of the vehicle, and transmit the command to the upstream vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Systems and methods are described herein for providing various features as part of a response vehicle management system. More particularly, systems and methods are described for providing a response vehicle control and monitoring system. The response vehicle control and monitoring system includes a transceiver onboard the response vehicle configured to interface with a mobile device (e.g., a smartphone, tablet, laptop, etc.). The transceiver facilitates communication between the systems of the response vehicle and the mobile device, facilitating user control and monitoring of an incident and/or the response vehicle. The transceiver may interface with, for example, the drivetrain, command system, sirens, lighting, generators, and/or governors of the response vehicle. A user may monitor the health of the response vehicle, confirm that its systems are operating within normal parameters, and retrieve (e.g., view, download, etc.) vehicle diagnostics.

The user device may receive information from the response vehicle that is stored onboard the vehicle. The information may be provided as a webpage on the user device, eliminating the need for the user to download an application to interface with the response vehicle and allowing the user interface to be used across different user devices (e.g., on different platforms, on devices with different operating systems, etc.). The webpage content may be stored onboard the response vehicle.

In one embodiment, the communications system facilitates localized wireless communication between various response vehicles and other devices. For example, several response vehicles may respond to an incident and be spread out over a wide area around the incident. The communications systems of one response vehicle may facilitate communications with other, surrounding response vehicles and/or user devices. For example, a commander may be within wireless range of one response vehicle but not the other response vehicles. The communications systems of the response vehicles may act as repeaters, allowing the commander to communicate with each of the response vehicles, even those that are out of range of the commander's mobile device.

In one embodiment, the user devices communicate with the response vehicles via Wi-Fi. In other embodiments, the communications between the user devices and/or response vehicles may be supported via CDMA, GSM, or another cellular connection. In still other embodiments, another wireless protocol is utilized (e.g., Bluetooth, Zigbee, radio, etc.).

Response Vehicle

Figure 1:
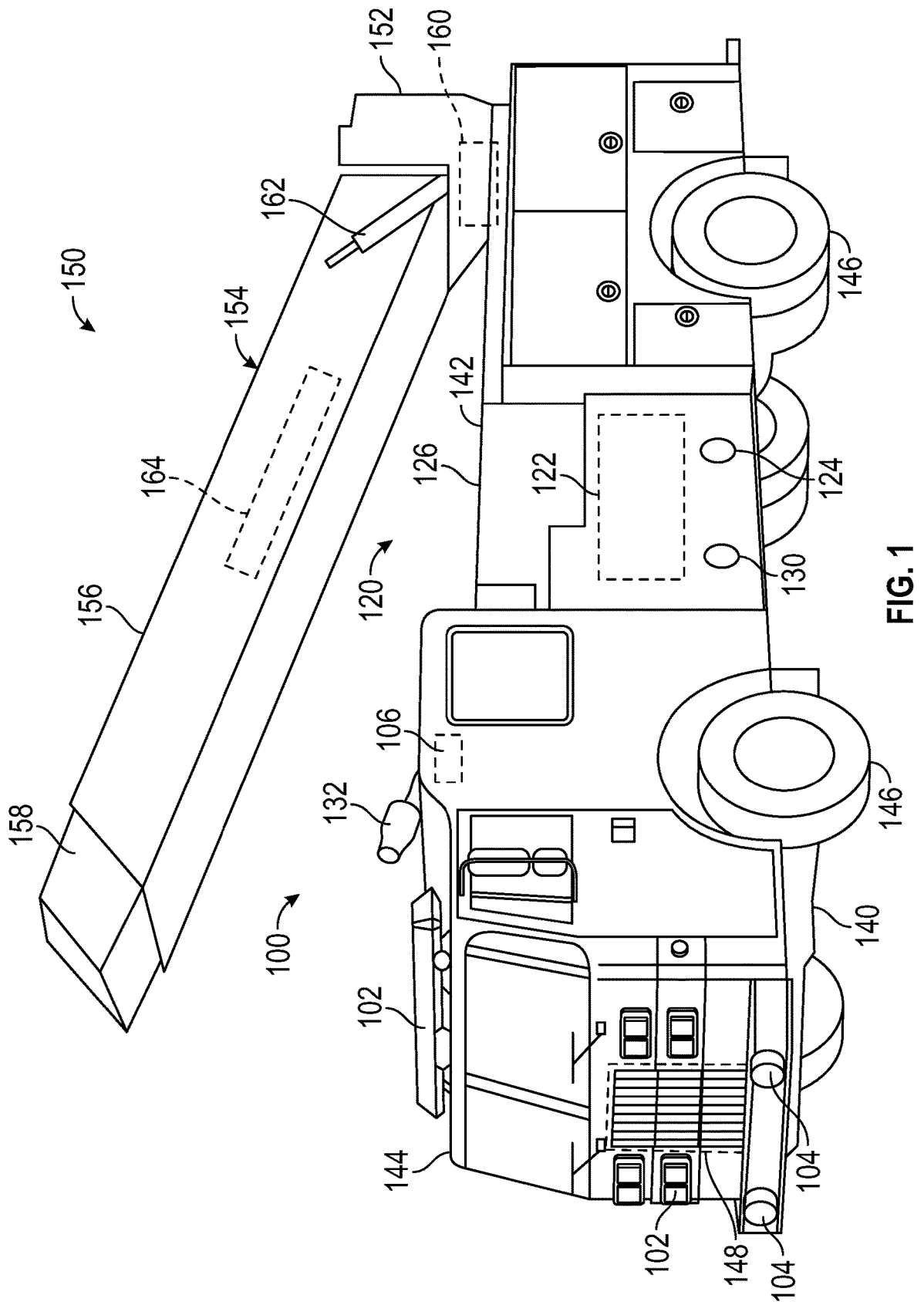
FIG. 1 is a perspective view of a response vehicle including various features described herein, according to an exemplary embodiment.

Referring to FIG. 1, a response vehicle 100, shown as a fire truck or firefighting vehicle, includes a visual indicator, shown as a plurality of emergency lights 102, used to indicate the presence of vehicle 100 and any surrounding danger. Emergency lights 102 may be located in the front, back, and/or the top of the vehicle, or in any other location, to provide the clearest possible view of the lights. Vehicle 100 includes audio output devices or audible indicators (e.g., sirens, etc.), shown as speakers 104. Speakers 104 may be used to provide an audible warning. Emergency lights 102 and speakers 104 may include a transmitter, actuation of which provides a visual and an audible alert, respectively.

Response vehicle 100 includes an onboard communications device 106 (e.g., a wireless communication interface) for transmitting and receiving data via a wireless connection. Communications device 106 facilitates wireless communication with various user devices and/or other vehicles 100. For example, communications device 106 may transmit response vehicle information to a user device of an occupant of the vehicle, to a commander on site at an incident, and/or to a system or person positioned remotely relative to an incident. Further, communications device 106 may facilitate transmissions between multiple response vehicles. In one embodiment, communications device 106 at least one of includes or acts as a repeater, facilitating transmission of signals from another source (e.g., a commander user device, etc.) to a device or response vehicle out of range of the original source.

Response vehicle 100 includes an onboard pumping or suppressant delivery system, shown as pumping system 120. Pumping system 120 is configured to provide a flow of fluid (e.g., a fire suppressant such as water, foam, chemical, etc.) to facilitate addressing (e.g., extinguishing, suppressing, preventing the ignition of, etc.) a fire. As shown, pumping system 120 includes a fluid driver, shown as pump 122, that is configured to receive the fluid from a source at a relatively low pressure and supply a flow of the fluid at an elevated pressure. Response vehicle 100 includes an inlet (e.g., a hose connection), shown as inlet connection 124, configured to be connected to an external source of fluid (e.g., a body of water, a fire hydrant, etc.). Additionally or alternatively, response vehicle 100 may include an onboard source of fluid, shown as tank 126, that transports the fluid along with the response vehicle 100. Response vehicle 100 includes an outlet (e.g., a hose connection), shown as outlet connection 130, configured to be connected to an external source of fluid (e.g., a body of water, a fire hydrant, etc.). Additionally or alternatively, response vehicle 100 may include an onboard nozzle, shown as monitor 132, that is configured to provide a stream or spray of fluid (e.g., a spray of water of suppress a nearby fire). Monitor 132 may be aimed by an operator to direct the stream toward the fire.

Response vehicle 100 may include various structure to support, power, and transport the other components of response vehicle 100. As shown, response vehicle 100 includes a frame, shown as chassis 140, that supports a body 142 and a front cabin, shown as cab 144. Body 142 may contain and support other components of refuse vehicle 100, such as pumping system 120. Cab 144 may contain one or more personnel (e.g., a driver and passengers). Response vehicle 100 further includes a series of tractive elements 146 (e.g., wheel and tire assemblies) rotatably coupled to chassis 140 and configured to support chassis 140. Response vehicle 100 may include a prime mover (e.g., an internal combustion engine, an electric motor, a hybrid drive system, etc.), shown as engine 148, that drives tractive elements 146 to propel response vehicle 100.

As shown in FIG. 1, the response vehicle 100 includes an implement, lift assembly, ladder assembly, access assembly, or aerial, shown as aerial assembly 150. The aerial assembly 150 includes a rotating portion, shown as turntable 152, and a telescoping or extendable ladder assembly, shown as ladder assembly 154. The turntable 152 is rotatably coupled to the chassis 140. The ladder assembly 154 includes a first ladder section, shown as base section 156, slidably coupled to a second ladder section, shown as fly section 158. The fly section 158 is movable longitudinally relative to the base section 156 to vary a length of the ladder assembly 154 (e.g., to extend or retract the ladder assembly 154). In other embodiments, the ladder assembly 154 includes additional ladder sections or only includes one ladder section.

The response vehicle 100 includes a series of actuators configured to operate the aerial assembly 150. A first actuator (e.g., a hydraulic or electric motor), shown as turntable actuator 160, is configured to control rotation of the turntable 152 relative to the chassis 140 (e.g., about a vertical axis). A second actuator (e.g., a hydraulic cylinder, an electric linear actuator, etc.), shown as ladder lift actuator 162, is configured to control lifting (e.g., an angle of incline) of the ladder assembly 154 relative to the turntable 152. By way of example, the ladder lift actuator 162 may cause the base section 156 to rotate relative to the turntable 152 about a horizontal axis. A third actuator (e.g., a hydraulic cylinder, an electric linear actuator, etc.), shown as ladder extension actuator 164, is configured to control extension of the fly section 158 relative to the base section 156.

While vehicle 100 is shown as a fire truck, it should be understood that the systems and methods disclosed herein are applicable to an ambulance, a police vehicle, a tow truck, a public utility vehicle, a municipal vehicle (e.g., a refuse vehicle, a concrete mixer, etc.), a military vehicle, a lift device (e.g., a boom lift, a scissor lift, a telehandler, etc.), or any other type of response vehicle or other vehicle. Further, the systems and methods disclosed herein may be applicable for any type of incident, scene, or site in which wireless communications between one or more vehicles and user devices is advantageous.

Incident Scene

Figure 2:
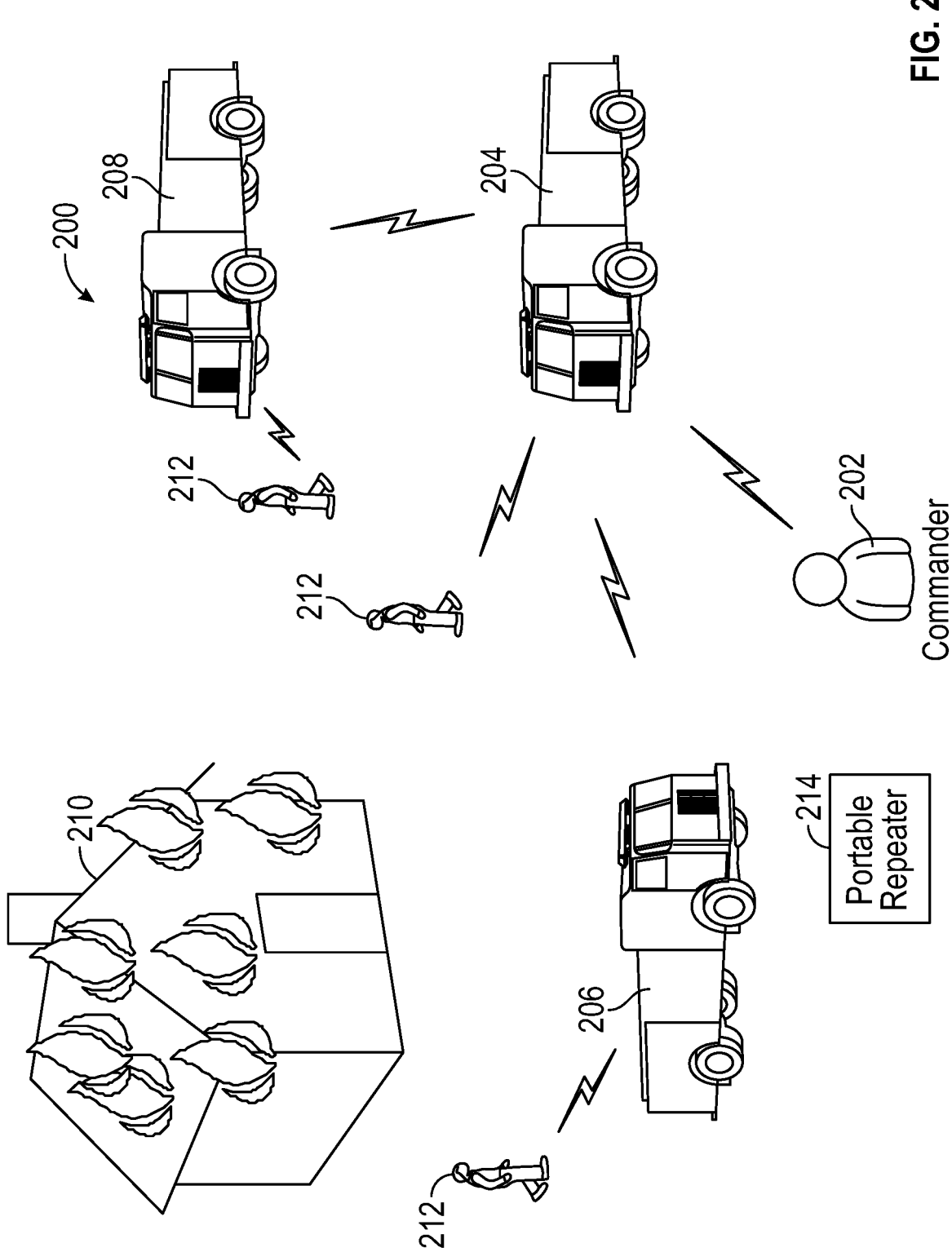
FIG. 2 is a schematic view of an exemplary incident, with several response vehicles responding to the incident, the response vehicles facilitating wireless communications between one another, a commander, and other users, according to an exemplary embodiment.

Referring to FIG. 2, an exemplary environment 200 (e.g., a scene of an emergency, an incident scene, etc.) includes a plurality of response vehicles that have responded to an incident. Response vehicles 204, 206, 208 (e.g., examples of response vehicles 100) are shown on site at an incident 210 (e.g., a house fire, an accident, etc.). Several personnel 212 are shown on site as well. A commander 202 (e.g., one of the personnel 212) may be on site and responsible for managing the response to incident 210.

One or more of the response vehicles 204, 206, 208 may include an onboard communications device 106 facilitating communications between the response vehicles and user devices. For example, a response vehicle may be in range of one or more personnel 212 on site at incident 210, and may transmit information to and receive information from personnel user devices (e.g., mobile devices, etc.) that are on the person of (e.g., carried by) those personnel.

In one embodiment, the onboard communication devices of the response vehicles at least one of include or act as repeaters. For example, some response vehicles (e.g., response vehicle 208, etc.) may be out of the direct communication range of the user device of commander 202. The onboard communication device of response vehicle 204 may include or act as a repeater. Upon receiving a transmission from a user device of commander 202, the onboard communications device of response vehicle 204 may relay the transmission to response vehicles 206, 208. Response vehicles 206, 208 may then provide the transmission to personnel 212 in range, evaluate a vehicle or vehicle system command specified in the transmission, and/or perform still another task.

Similarly, since some response vehicles may be outside of the range of commander 202, the onboard communications device of response vehicle 204 may be used as a repeater to relay transmissions from the out of range response vehicles (e.g., vehicle 208, etc.) or personnel to a user device of commander 202. For example, response vehicle 204 may relay status information, warnings, and other information to commander 202 from response vehicle 208. Such communication may allow commander 202 to more effectively manage personnel and equipment on site.

In one embodiment, the information relayed between commander 202, personnel 212, and response vehicles 204, 206, 208 includes status information (e.g., vehicle status data) for the response vehicle. Status information may include, for example, general vehicle diagnostic activity (e.g., if fuel is low, if oil is low, other general vehicle-related errors, etc.), or information regarding various vehicle subsystems (e.g., water tank levels, foam tank levels, coolant temperature, battery levels, engine temperatures, fuel levels, pump operation (e.g., pump speed, pump pressures, pump flow rates, etc.), warning lights, sirens, navigation system, etc.). The information may be displayed on one or both of a display provided as part of the response vehicle and on a user device of commander 202 and/or personnel 212. In one embodiment, the information is transmitted to a user device and displayed on the user device in a webpage format. This information may be retrieved by the response vehicle from vehicle subsystems. For example, the information may be retrieved in real-time or near real-time as the vehicle is in operation (e.g., the vehicle is being driven or actively used in response to an incident, etc.). The commander may then use the information to manage use of the response vehicles at the incident. Additionally or alternatively, the information may be retrieved from vehicle subsystems in between incidents.

Vehicle Management System

Figure 3:
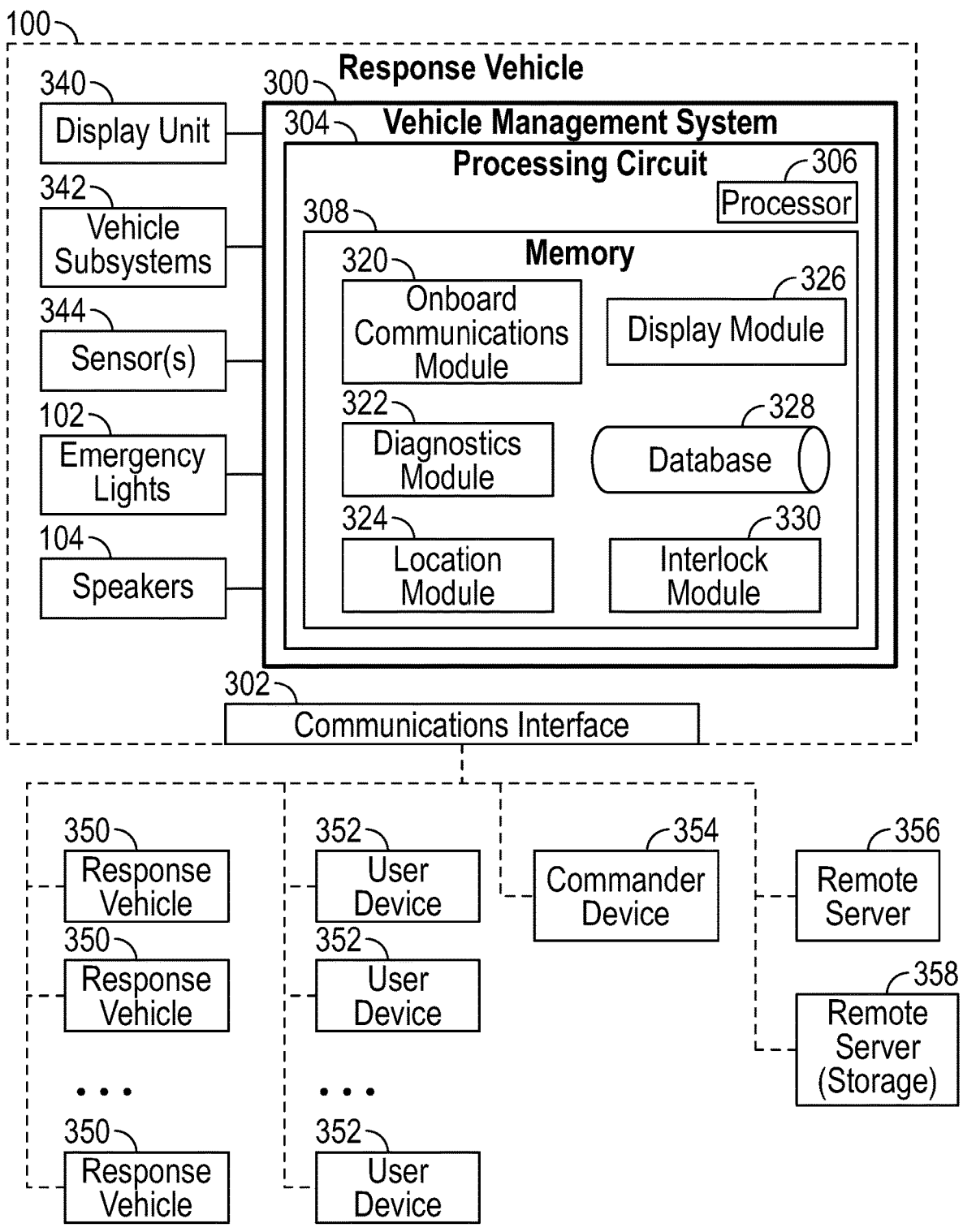
FIG. 3 is a block diagram of a vehicle management system for a response vehicle, according to an exemplary embodiment.

Referring now to FIG. 3, a vehicle management system 300 is provided as part of response vehicle 100. Vehicle management system 300 is generally configured to manage various aspects and features of the response vehicle. For example, vehicle management system 300 may facilitate or otherwise manage communication between the response vehicle and other response vehicles and user devices. As another example, vehicle management system 300 may provide various data logging and diagnostic features, and may provide such information to user devices via a wireless connection and to a display unit of the response vehicle. As another example, vehicle management system 300 may monitor vehicle performance and determine any potential faults or warning associated with the vehicle, and wirelessly transmit the faults or warnings to a user device. As another example, vehicle management system 300 may facilitate integration of a navigation and mapping application, providing a display to a user that identifies points of interest in responding to an incident (e.g., location of hydrants, hazards, locations of other response vehicles, etc.). In some embodiments, vehicle management system 300 may be integrated with other vehicle systems of response vehicle 100. In other embodiments, some functionality of vehicle management system 300 may occur remotely from response vehicle 100 at a remote server (e.g., the remote server 356 or the remote server 358) or another device. By way of example, any functionality described herein with respect to vehicle management system 300 may be performed locally on a response vehicle 100, in a remote server 356, or distributed between one or more response vehicles 100 and/or one or more remote servers 356.

In one embodiment, response vehicle 100, and more particularly vehicle management system 300, is configured to wirelessly communicate with a plurality of other response vehicles 350, user devices 352, and/or at least one commander device 354. As described above with reference to FIG. 2, response vehicle 100 facilitates communication between various systems and devices. For example, response vehicle 100 may at least one of include or act as a repeater, allowing a signal from a first response vehicle 350 and/or user device 352 to reach other vehicles and/or devices out of range of the transmitting vehicle and/or device. Response vehicle 100 may be out of range of some of the devices and/or vehicles, and another response vehicle 350 may act as a repeater for transmitting a signal from response vehicle 100 to the out-of-range source.

In some embodiments, as shown in FIG. 2, one or more of the response vehicles 204, 206, 208 (and/or response vehicle 100) include a portable unit or connectivity hub, shown as portable repeater 214. Portable repeater 214 may be removably or releasably coupled to the chassis of a respective response vehicle and configured to be selectively deployed by a user (e.g., personnel 212, commander 202, etc.). The portable repeater 214 may include onboard processing circuitry to facilitate providing the functionality described herein. The portable repeater 214 is configured to facilitate remote communication between one or more users and/or one or more response vehicles, according to an exemplary embodiment. For example, one or more portable repeaters 214 may be associated with a response vehicle and may be carried by a user. The user, if they are responding to an incident and have to walk far away from the response vehicle (e.g., the incident is in a rural place, etc.), may place the portable repeaters 214 out in the field. The portable repeaters 214 may then detect signals sent from either a user device or the response vehicle, and retransmit the signals at a power level greater than a power level of the received signals, facilitating wireless communications between the user and the response vehicle even if the user is out of wireless range (e.g., a distance beyond which wireless communication is not reliable, etc.) of the response vehicle. More than one portable repeater 214 may be used. The portable repeater 214 may be a battery-powered device and may be stored (and charged) in or on the response vehicle when not in use. The portable repeater 214 may be associated with the response vehicle such that the portable repeater 214 is configured for secure wireless communications with the response vehicle. In other words, communications may be secure between the user and the particular response vehicle. The response vehicle communications module may wirelessly transmit data to other user devices, a commander, other vehicles, etc.

As shown in FIG. 3, vehicle management system 300 includes a processing circuit 304 including a processor 306 and memory 308. Processor 306 may be a general purpose or specific purpose processor, an application specific integrated circuit (ASIC), one or more field programmable gate arrays (FPGAs), a group of processing components, or other suitable processing components. Processor 306 may be configured to execute computer code or instructions stored in memory 308 or received from other computer readable media (e.g., CDROM, network storage, a remote server, etc.) to perform one or more of the processes described herein. Memory 308 may include one or more data storage devices (e.g., memory units, memory devices, computer-readable storage media, etc.) configured to store data, computer code, executable instructions, or other forms of computer-readable information. Memory 308 may include random access memory (RAM), read-only memory (ROM), hard drive storage, temporary storage, non-volatile memory, flash memory, optical memory, or any other suitable memory for storing software objects and/or computer instructions. Memory 308 may include database components, object code components, script components, or any other type of information structure for supporting the various activities and information structures described in the present disclosure. Memory 308 may be communicably connected to processor 306 via processing circuit 304 and may include computer code for executing (e.g., by processor 306, etc.) one or more of the processes described herein.

As shown in FIG. 3, memory 308 includes an onboard communications module 320. Onboard communications module 320 is configured to facilitate wireless communications with user devices and with other response vehicles via communications interface 302 (e.g., a transceiver, a communication circuit, etc.). Communications interface 302 may support any kind of wireless standard (e.g., 802.11 b/g/n, 802.11a, etc.) and may interface with any type of mobile device (e.g., laptop, tablet, smartphone, etc.) having Wi-Fi capability. Communications interface 302 may further facilitate wireless communications with an external global positioning system (GPS). Onboard communications module 320 may be any type of Wi-Fi capable module (e.g., a CL-T04 CANect® Wi-Fi Module manufactured by HED Inc., etc.) configured to support wireless communications with the mobile devices and other response vehicles. Onboard communications module 320 may include various security features for providing secure communications between the response vehicles 350, user devices 352, and/or commander device 354. Such a module may further include other response vehicle-related features that may be used in the systems and methods disclosed herein (e.g., diagnostics features, navigation features, etc.). Onboard communications module 320 is described in greater detail below with reference to FIG. 4.

As shown in FIG. 3, memory 308 includes a diagnostics module 322. Diagnostics module 322 receives data relating to response vehicle operation (e.g., vehicle status data, etc.) and provides diagnostic information to user devices. In various embodiments, some of the aspects of diagnostics module 322 may be integrated into the operation of onboard communications module 320 (e.g., onboard communications module 320 may include sub-modules for capturing vehicle status data and transmitting the vehicle status data to the user devices, etc.); while the activities of diagnostics module 322 are described separately from the communications module 320 in the present disclosure, other embodiments having combined modules are within the scope of the present disclosure. In some embodiments, the diagnostics module 322 analyzes the vehicle status data and provides determinations based on the analysis.

In some embodiments, diagnostics module 322 identifies an error or fault associated with the response vehicle based on vehicle status data. The error or fault may be a specific error or fault instead of a generic warning. For example, instead of displaying a "check engine" light on a display of the response vehicle, a more specific fault message may be displayed that allows a user to more quickly diagnose and repair the problem. The fault message may be displayed on a display unit 340 of the response vehicle and/or on a user device 352 (e.g., transmitted to the user device by communications interface 302, etc.). The fault message and/or diagnostic information may also be transmitted to a remote location (e.g., a central repair facility, etc.).

In some embodiments, the diagnostics module 322 uses the vehicle status data to predict failure of a component of the response vehicle 100. By way of example, the diagnostics module 322 may utilize artificial intelligence (e.g., a neural network) to perform the prediction. In some embodiments, the diagnostics module 322 utilizes a rated operating life of a component (e.g., provided by a manufacturer of the component) to predict a component failure. The diagnostics module 322 may utilize the vehicle status data to monitor operation of the component over time, logging the cumulative amount and/or type of usage experienced by the component. By way of example, the diagnostics module 322 may monitor an amount of fluid pumped by the pumping system 120 or an operating time of an engine above a predetermined engine RPM. The diagnostics module 322 may compare the cumulative usage of the component against the rated operating life of the component and predict when the component will fail if past usage levels continue.

In some embodiments, the diagnostics module 322 monitors the vehicle status data for a change in vehicle status that may be indicative of an oncoming component failure. An operating characteristic of the component may remain within a normal operating range until the component is about to fail, after which the component may fall above or below the normal operating range. By way of example, an engine temperature exceeding a normal operating range may be indicative of an upcoming component failure. By way of another example, a decrease in fuel economy may be indicative of an upcoming component failure. The normal operating range and/or the correlation between an operating characteristic and component failure may be determined by the diagnostics module 322 by analyzing the vehicle status data over time. By way of example, the diagnostics module 322 may train a neural network based on historical vehicle status data and known component failures.

In response to predicting an upcoming component failure, the diagnostics module 322 may provide a notification (e.g., to a user device 352, to a remote server 356, to a user interface on the response vehicle 100, etc.). The notification may indicate the component that is predicted to fail, a predicted failure timing (e.g., a future date), a predicted failure mode (e.g., how/why the component will fail), a predicted failure consequence (e.g., what systems of the response vehicle 100 will be affected by the failure), and/or a cost to replace the component. The diagnostics module 322 may provide a user with a prompt to contact a maintenance provider to schedule preventative service based on the predicted component failure. The diagnostics module 322 may suggest a date, time, and location of the maintenance appointment and complete scheduling of the maintenance appointment in response to user approval. Based on the identity of the component that is predicted to fail and the predicted failure mode, the diagnostics module 322 may also suggest a preventative maintenance process that, if performed will prevent or otherwise mitigate the failure.

In some embodiments, the diagnostics module 322 transfers the relevant to a maintenance provider (e.g., a third party service provider, a maintenance department of an organization that owns and/or operates the response vehicle 100, etc.). The data may include vehicle status data, a current health of one or more components, fault codes associated with any known failures, and predicted data regarding the failure of one or more components. The maintenance provider may utilize the received data to (a) perform preventative maintenance on the response vehicle 100, (b) determine one or more replacement components to order, (c) determine a readiness score for each response vehicle 100 in a fleet (e.g., a predicted likelihood of failure for each response vehicle 100), and/or (d) troubleshoot known issues regarding a response vehicle 100.

In some embodiments, the diagnostics module 322 identifies a response vehicle 100 that is suitable for a given task. A user may indicate (e.g., through a user device) desired criteria for one or more response vehicles 100 that will respond to an incident. By way of example, the criteria may include a desired quantity of response vehicles 100 (e.g., one response vehicle 100, three response vehicles 100, etc.). The user may select a desired task to be performed and/or a required functionality of the response vehicle 100 (e.g., onboard foam or water storage, pumping capability, a ladder reach at maximum extension, crew capacity, life support systems, etc.). The user may select desired onboard equipment (e.g., portable ladders, gurneys, tools, medical equipment, etc.). The user may select a desired readiness metric or score (e.g., based on maintenance status, fill levels of onboard tanks, charge levels, etc.). Based on the vehicle status data, the diagnostics module 322 may compare the desired criteria with the available response vehicles 100 and identify one or more response vehicles 100 meeting the desired criteria. The diagnostics module 322 may provide the user with locations of the identified response vehicles 100 and/or cause the identified response vehicles 100 to provide notifications (e.g., lights and/or sound) that facilitate finding the identified response vehicles 100. The diagnostics module 322 may identify one or more response vehicles 100 that do not meet the desired criteria (e.g., are not suitable to perform a desired task) and/or identify one or more response vehicles 100 that do meet the desired criteria.

As shown in FIG. 3, memory 308 includes a location module 324 configured to provide located-related information for display on display unit 340 and/or a user device 352. Location module 324 may communicate with a remote server 356 to receive navigation and location information relevant to the response vehicle 100. For example, location module 324 may map a destination (e.g., the site of an incident, etc.) using obtained location or coordinate data, may provide turn-by-turn directions to an incident, and may provide geographical data relevant to the response vehicle 100 and incident (e.g., the location of hydrants and water points if the incident is a fire, etc.). In some embodiments, location module 324 and/or vehicle management system 300 are configured to function without connecting to remote server 356 (e.g., receive manual entry of an incident location and provide navigation information, etc.).

As shown in FIG. 3, memory 308 includes a display module 326. Display module 326 is configured to generate a display to provide on display unit 340 of the response vehicle and/or a user device 352. Display unit 340 may be, for example, a touchscreen display (e.g., a CANlink® CL-711 display manufactured by HED Inc., etc.) having a resistive touchscreen that receives a touch input from a user. Display unit 340 may support any type of display feature, such as a flipbook-style animation, or any other type of transition feature. Display unit 340 may generally provide a plurality of navigation buttons that allow a user to select various displays and other options via touch. Display unit 340 may further, upon detection of a fault, provide a display that relates to the fault. For example, if a tire pressure fault is detected, a tire pressure screen may be displayed that provides current tire pressure information for the response vehicle. Display unit 340 may have a wired or wireless connection with other response vehicle subsystems and/or with remote devices.

As shown in FIG. 3, memory 308 includes a database 328 configured to store information captured by the various vehicle subsystems 342. Data may generally include telemetry data, diagnostics data, and access data. Vehicle status data may include, for example, data relating to the operation of the response vehicle such as system statuses, HVAC status, the status of various vehicle subsystems and components (e.g., engine, transmission, tire pressure, brakes, pump (s), etc.), vehicle status (e.g., if a door is open, if equipment is deployed, etc.), etc. In other words, vehicle status data includes vehicle status information that may be relevant to a commander or other user during a response to an incident and/or a maintenance technician. The data may be time stamped and include a vehicle identifier.

In some embodiments, the vehicle status data is provided by one or more sensors 344. The sensors 344 may include any type of sensor, such as temperature sensors, strain gauges, pressure sensors, potentiometers, fill level sensors, current sensors, voltage sensors, load cells, altimeters, accelerometers, gyroscopes, position sensors, or other types of sensors that can provide information regarding the status of the vehicle or the immediate surroundings. The sensors may provide vehicle status data regarding the status of any component of the vehicle 100 (e.g., water tank levels, foam tank levels, coolant temperature, battery levels, engine temperatures, fuel levels, pump operation (e.g., pump speed, pump pressures, pump flow rates, etc.), vehicle speed, vehicle acceleration, steering angle, or other statuses).

The data may be removed from database 328 once the data is uploaded from the local database to a remote cloud storage. For example, long-term storage of the vehicle status data and other data may be done on a centralized server 358, and communications interface 302 may wirelessly connect with remote server 358 to transmit and store the data. As described above, the data includes a timestamp and vehicle identifier information to identify the data in remote server 358. Data may be stored in database 328 until transmission to remote server 358. The data may be kept in database 328 to allow for a "snapshot" view of the data on a user device (i.e., once the data is captured, the data may be provided shortly thereafter to user devices near the scene of an incident, etc.).

In one embodiment, the data is automatically updated periodically. The data may also be updated upon user request. A controller area network (CAN) controller, such as diagnostics module 322 or another module may be configured to monitor the data and to determine when a potential status of the response vehicle 100 has changed based on the vehicle status data changes.

Database 328 may be any type of database (e.g., a SQLite database, etc.), and diagnostics module 322 may query the database using any type of language or method via backend framework. The backend framework of vehicle management system 300 may support the activities of periodically updating and querying database 328, as well as providing web layer authentication (e.g., to authenticate devices that attempt to access data from database 328, etc.). The backend framework may further support the various security-related functionality of onboard communications module 320.

Vehicle management system 300 may include, for example, a data transport protocol layer configured to facilitate the query of data from database 328 for use by the various modules of memory 308. In one embodiment, at least one of web sockets and AJAX polling is used to invoke queries via backend framework and provide the data to the frontend applications (e.g., the application layer, the modules, etc.), as they allow changes to database 328 to be detected and pushed to the application layer. The use of web sockets and/or AJAX may be based on compatibility constraints and performance constraints with the user devices 352 accessing vehicle management system 300. The application layer, or the frontend application, of vehicle management system 300 may be built using, for example, HTML5, CSS, and various Javascript libraries.

As shown in FIG. 3, memory 308 includes an interlock module 330. Interlock module 330 is configured to at least one of (i) prevent unintended, accidental, and/or unauthorized engagement and/or disengagement of one or more of the vehicle subsystems 342 (e.g., transmission, pumps, brakes, water system, foam system, lighting systems, sirens, engine, generator, etc.) and (ii) reduce the likelihood of theft of the response vehicle 100. For example, a response vehicle (e.g., a fire truck, an ambulance, a police vehicle, etc.) is often left running and unattended when the response vehicle arrives at the scene of an incident (e.g., a fire, a vehicle collision, a building, etc.). Such an occurrence may leave traditional response vehicles prone to theft as anyone is able to enter the response vehicle and drive away.

The interlock module 330 may be configured to facilitate activating one or more interlocks that prevent the response vehicle and/or components thereof (e.g., water pump, foam system, sirens, lights, etc.) from being operated by an unauthorized user. For example, when arriving at a scene of an incident, an operator of the response vehicle 100 may be able to enter the response vehicle into a "scene mode" or "lock mode" using one or more commands (e.g., a user request, etc.) on the display unit 340, the user device 352 (e.g., a wireless control interface, etc.), the commander device 354 (e.g., a wireless control interface, etc.), and/or other input devices of the response vehicle 100 (e.g., switches, dials, toggles, parking brake, etc.). In some embodiments, interlock module 330 is configured to engage a parking brake and/or lock a transmission of the response vehicle 100 when the scene mode is activated. In other embodiments, the interlock module 330 is configured to activate the scene mode in response to the parking brake being activated (e.g., engaged, etc.) by an operator of the response vehicle 100. In still other embodiments, the interlock module 330 is configured to automatically enter the scene mode based on an indication relating to the response vehicle 100 arriving at a scene and/or automatically based on an indication relating to the presence of an operator (e.g., the lack of the presence of an operator, an operator exiting the response vehicle 100, an operator opening the door of the response vehicle 100, etc.). According to an exemplary embodiment, the interlock module 330 is configured to facilitate operation of at least one of an engine, a generator, a pump, a foam system, a water system, a siren, a lighting system, etc. while in the scene mode. According to an exemplary embodiment, such as system controlled by the interlock module 330 does not require modification to Federal Motor Vehicle Safety Standards ("FMVSS") brake circuit control of parking brakes.

According to an exemplary embodiment, activating the scene mode prevents an operator from shifting the transmission of the response vehicle 100 from a locked condition (e.g., corresponding to a parking gear, etc.) to an operational condition (e.g., out of park, corresponding to a drive gear and/or a neutral gear, etc.) and/or releasing the brakes (e.g., switching from an engaged configuration that limits movement of the response vehicle 100 to a disengaged configuration that does not limit movement of the response vehicle 100, etc.). For example, the interlock module 330 may lock the transmission and/or the brakes such that the response vehicle 100 may not be moved by an unauthorized user. To move the response vehicle 100 and/or deactivate the scene mode, the interlock module 330 may require a user to enter an access code (e.g., username, ID, password, on the display unit 340, on the user device 352, on the commander device 354, etc.) and/or perform a series of actions (e.g., activate and/or deactivate a series of switches and/or buttons, a fingerprint scan, a facial recognition scan, a retinal scan, etc.) to verify the user has permission to move the response vehicle 100. Once the user is verified, the interlock module 330 is configured to disengage the locks on the brakes and/or the transmission to allow the user to move the response vehicle 100.

According to an exemplary embodiment, activating the scene mode prevents the response vehicle 100 from rolling or otherwise moving in response to intentional and/or unintentional disengagement of the parking brake or other brakes without the user verifying permission and/or access to do so. For example, an accidental disengagement of the parking brake may allow the response vehicle 100 to unintentionally begin to roll (e.g., if parked on a slope, if the transmission is in neutral, etc.). However, the interlock module 330 keeps the brakes engaged and/or the transmission locked until the scene mode is deactivated (e.g., by a user entering an appropriate access code, performing a series of actions, etc.) to prevent such unintended movement of the response vehicle 100.

While vehicle management system 300 is described in FIG. 3 as a single system within a response vehicle, it should be understood that the various activities of vehicle management system 300 may be performed by various vehicle subsystems of the response vehicle. The arrangement and activities of the various modules of vehicle management system 300 may vary according to different embodiments. Further, the activities of the vehicle management system 300 may be performed by multiple vehicle management systems, particularly where multiple response vehicles are present at an incident site.

Figures 4, 5, 6:
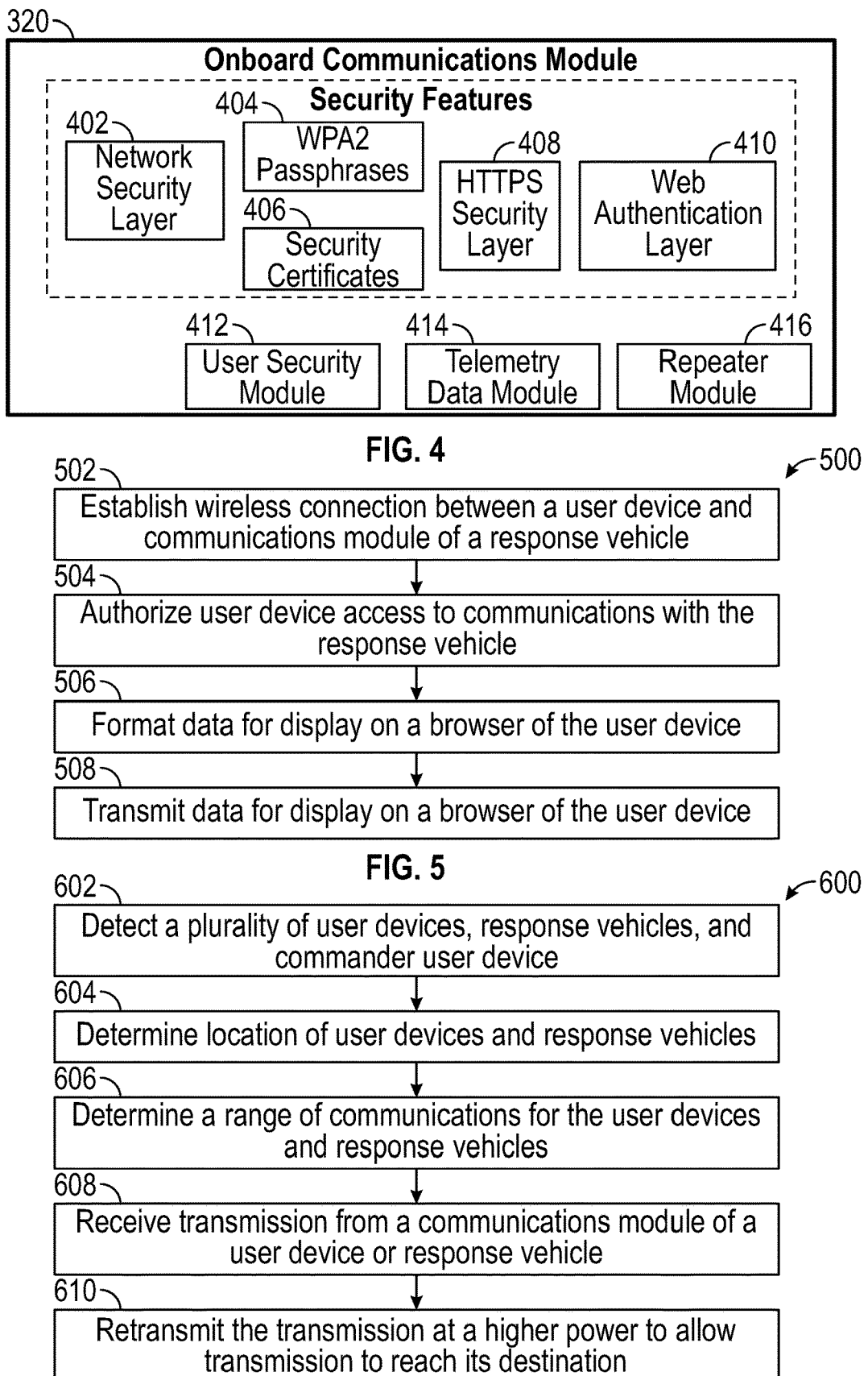
FIG. 4 is a detailed block diagram of the onboard communications module of the vehicle management system, according to an exemplary embodiment.
FIG. 5 is a flow chart of a process for enabling wireless communications between a response vehicle and a user device, according to an exemplary embodiment.
FIG. 6 is a flow chart of a process for enabling wireless communications between a plurality of response vehicles and user devices, according to an exemplary embodiment.

Referring now to FIG. 4, onboard communications module 320 is described in greater detail. In one embodiment, onboard communications module 320 includes a variety of security features to secure wireless communications with the other response vehicles and/or with the user devices. For example, onboard communications module 320 may include a network security layer 402 configured to prohibit unauthorized users and user devices from gaining access to the network being used by the response vehicles and associated user devices. Onboard communications module 320 may further support setting one or more WPA2 passphrases 404 to secure the network. A randomly generated SSID (service set identification) and long passphrase may be used to identify the network and secure the network from unauthorized users and user devices. Onboard communications module 320 may further support the use of security certificates 406 to verify the authenticity of a user device and/or other response vehicle device attempting to wirelessly communicate with the response vehicle.

Onboard communications module 320 may include a HTTPS security layer 408 configured to encrypt transmissions from the response vehicle using a local SSL certificate (e.g., to put the transmission under HTTPS instead of HTTP, etc.). Onboard communications module 320 may include a web authentication layer 410 configured to prevent unauthorized access. For example, even if a hacker or attacker accesses the communications from onboard communications module 320, they would still need a username and password (or other identification information) to read and/or change any data. Usernames, passwords, and other identification information may be provided via a separate interface from communications interface 302 and then used on the network supporting onboard communications module 320 communications. In one embodiment, a long term cookie may be set upon a successful authentication of a user device, which may be updated with timestamp information as the user continues to access the network shared with onboard communications module 320. Using the identification information, user devices may be given an appropriate permission level. For example, some user devices might have read-only access to data provided by the response vehicle, while other users may have read-write access (e.g., a commander, etc.). As another example, onboard communications module 320 may track who is currently in communication with the response vehicle, and may be configured to account for multiple people having read-write access (e.g., allowing only one user device at a time to have read-write access to the data, etc.). Different user interfaces (e.g., webpages, etc.) may be provided based on an access level of the user.

As shown in FIG. 4, onboard communications module 320 includes a user security module 412. User security module 412 may generally define a plurality of groups that allow and/or restrict functionality and access to the data provided by the response vehicle and/or control of the response vehicle. User security module 412 may define a plurality of groups including, by way of example only: technician, administrator, responder (e.g., firefighter, policeman, etc.), etc. A technician may be able to troubleshoot system level issues and provide diagnostics, repairs, and maintenance of the network and communications between the user devices and response vehicles. For example, the technician may be able to check for device and software updates (and to push the updates to the user devices) and may be provided with the highest level of security in accessing the network (having unrestricted access). A technician may further have the capability to configure the presentation of information on user devices (e.g., customizing a logo or name, etc.).

An administrator may be able to configure and provision field device access. For example, when responding to an incident, the administrator may manage which devices have access to which information. In other words, those in the administrator group may be able to act as a commander at an incident. Administrators may generally be able to add, modify, and/or delete device level user accounts, view reports of vehicle status data and other data, control one or more features of the response vehicle, and update device software and apply firmware patches manually as needed.

A responder (e.g., a policeman, a firefighter, etc.) may be a user in the field responding to an incident. The responder group may be created for users who have access to the network via a pre-authenticated device and/or user account. The responder may have to enter (or have previously entered) credentials specific to the user account to access the network. The responder may be able to view vehicle status data and manually control various onboard systems of the response vehicle (e.g., a subset of features of the response vehicle, etc.).

Onboard communications module 320 may include a telemetry data module 414 configured to analyze telemetry data relating to the transmissions over a network between response vehicles and user devices (e.g., the network 703). Telemetry data may generally refer to metrics relating to the transmission of signals to and from the response vehicle. The response vehicle 100 may include any number of sensors 344 configured to record telemetry data for use by onboard communications module 320. The telemetry data may be used to analyze the network performance of a Wi-Fi network local to the response vehicle on site at an incident. The telemetry data may be used to determine which devices and vehicles are capable of communicating with one another and facilitating connections to allow the devices and vehicles to communicate with one another.

Onboard communications module 320 may include a repeater module 416. Repeater module 416 may facilitate the operation of onboard communications module 320 as a repeater at the scene of an incident. Referring again to FIG. 2, one response vehicle 204 may be within wireless range of a commander 202 device, but another response vehicle 208 may not be. The commander may generally be responsible for managing all personnel and equipment at the incident site, and the personnel and equipment may be from different stations, thus making it challenging for the commander to manage. It may be determined, by telemetry data module 414, that the commander is out of range of at least some of the user devices and/or response vehicles.

In some embodiments, the communications module of response vehicle 204 includes or acts as a repeater (e.g., thereby allowing commander 202 to communicate with the out-of-range response vehicles, etc.). Commander 202 may thereby view the status of, command, and/or otherwise communicate with each of the response vehicles at the site. For example, the commander may be provided with data relating to the status of every response vehicle (e.g., to see if any response vehicle has a fault, is breaking down, is running low on fuel, etc.). Since the range of Wi-Fi communications may be limited at the incident site (e.g., 300 feet, etc.), the use of the communications module as a repeater to transmit signals at a stronger power level allows the commander to communicate back and forth with all personnel and/or equipment at the incident site.

A signal received at response vehicle 204 that is targeted for response vehicle 206 or 208 may be retransmitted by response vehicle 204 at a higher power level (e.g., relative to the signal as received, etc.), so that the signal may reach the appropriate destination. In one embodiment, repeater module 416 may receive the signal from a mobile device of commander 202 and determine if a retransmission of the signal is necessary for the signal to reach its destination. Repeater module 416 may include logic for determining the position of the various response vehicles on site at the incident (e.g., to determine if a signal reached a destination, to receive feedback from other response vehicles, etc.) and determine an appropriate transmission power.

Repeater module 416 may additionally receive transmissions from other response vehicles that are not powerful enough to reach the commander 202 device. Repeater module 416 may retransmit the signal so that the signal is strong enough to reach commander 202. In some embodiments, onboard communications module 320 is configured to facilitate communications with user devices via one or more portable repeaters 214.

Referring now to FIG. 5, a flow chart of a process 500 for enabling wireless communications between a response vehicle and a user device is shown, according to an exemplary embodiment. Process 500 may be executed by, for example, onboard communications module 320.

Process 500 includes establishing a wireless connection between a user device and a communications module of a response vehicle (block 502). Block 502 may include a user device initializing the connection (e.g., the user device sending a signal picked up by the communications module, etc.) or the communications module initializing the connection (e.g., upon arriving at an incident, the communications module, or the user device, may automatically set up the connection as the user is leaving the response vehicle, etc.).

Process 500 further includes authorizing user device access to communications with the response vehicle (block 504). Block 504 may include the user providing his or her credentials (e.g., login, password, etc.) or the user device automatically transmitting its credentials to the response vehicle, and the communications module verifying the user device.

In one embodiment, vehicle status data, diagnostics data, telemetry data, or other data may be transmitted to the user device. The transmission may be based on a scheduled or automatic transmission of the data or a user request of the data. Process 500 may include formatting the data for display on the user device (block 506). For example, the data may be displayed on a browser of the user device instead of being displayed via an application. Process 500 further includes transmitting the data for display on the browser of the user device (block 508). The data may include vehicle status data, diagnostics data, telemetry data, or any other data relating to the operation of the response vehicle or to the incident.

Referring now to FIG. 6, a flow chart of a process 600 for enabling wireless communications between a plurality of response vehicles and/or user devices is shown, according to an exemplary embodiment. Process 600 may be executed by, for example, onboard communications module 320. Process 600 may be executed to allow a communications module of a response vehicle to function as a repeater.

Process 600 includes detecting devices, which may include a plurality of user devices, response vehicles, and/or a commander user device (block 602). For example, a number of response vehicles (and personnel) may arrive at an incident, and block 602 may include determining the presence of the various response vehicles and/or user devices. Process 600 further includes determining the location of the various user devices and/or response vehicles (block 604), and determining a range of communications for the user devices and/or response vehicles (block 606). Blocks 604 and 606 may be executed to determine which communications modules are capable of reliably communicating with one another. Since the location of the various personnel and vehicles on site may vary, and Wi-Fi transmissions may be limited, some user devices including a commander user device may not be in range of all response vehicles. Block 606 may include receiving telemetry data from a plurality of sensors (e.g., sensors 344, etc.) and devices, and using the telemetry data to analyze the communications capabilities at the incident site.

Process 600 further includes receiving a transmission from a communications module (block 608). The transmission may originate from a user device and/or response vehicle, and may be intended for a communications module not in range of the original communications module. For example, the transmission may be from a commander user device for a response vehicle outside of wireless range. As another example, the transmission may be from a communications module of a response vehicle, including vehicle status data, diagnostics data, telemetry data, and/or other data. Process 600 further includes retransmitting the transmission at a higher power than received (block 610), allowing the transmission to reach its destination.

Incident Management System

Figure 7A:
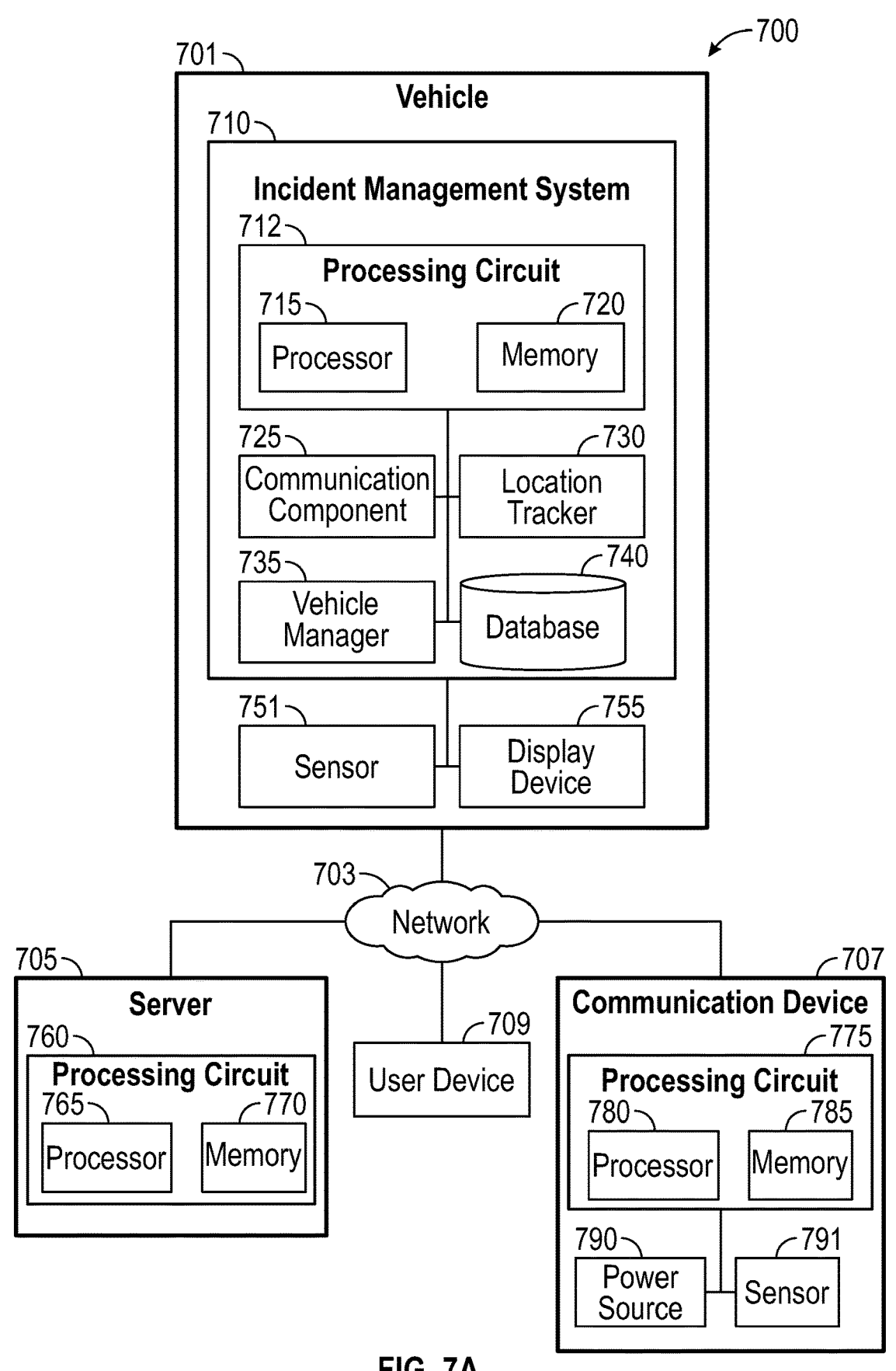
FIG. 7A is a block diagram of a system including a vehicle, according to an exemplary embodiment.

FIG. 7A depicts a block diagram of an incident management system or emergency response telematics system, shown as system 700, according to an exemplary embodiment. The system 700 collects, analyzes, and distributes data pertaining to one or more emergency response agencies (e.g., interoperable agencies). Such agencies (e.g., fire and rescue, law enforcement, medical services, military, etc.) may utilize the data and analysis of the system 700 to facilitate responding to an emergency or incident (e.g., a fire, a building collapse, an earthquake, an active shooter, a hurricane, a flood, a vehicle crash, a snow storm, etc.), to better plan for responses to future incidents, to maintain equipment of the system 700, or to otherwise facilitate operating the agencies.

Certain components of the system 700 may include one or more processors, memory, network interfaces, communication interfaces, and/or user interfaces. Memory may store programming logic that, when executed by the processor, controls the operation of the corresponding computing system or device. Memory may also store data in databases. The network interfaces may allow the systems and/or components of the system 700 to communicate wirelessly. The communication interfaces may include wired and/or wireless communication interfaces and the systems and/or components of the system 700 may be connected via the communication interfaces. The various components in the system 700 may be implemented via hardware (e.g., circuitry), software (e.g., executable code), or any combination thereof. Systems, devices, and components in FIG. 7A may be added, deleted, integrated, separated, and/or rearranged.

As shown in FIG. 7A, the system 700 includes at least one vehicle 701, at least one network 703, at least one server 705, at least one connection module or communication device 707, and at least one user device 709. The vehicles 701 may include response vehicles (e.g., fire vehicles, police vehicles, medical response vehicles, etc.) that facilitate responding to the incident. The network 703 facilitates data communication between the components of the system 700. The server 705 stores, analyzes, and/or distributes data collected by the system 700. The communication devices 707 act as data sources and facilitate connecting vehicles 701, individuals (e.g., response agency personnel, individuals affected by the incident, etc.), or equipment to other components of the system 700. The communication devices 707 may utilize various sensors to collect data characterizing the corresponding object or individual. The user devices 709 may facilitate communicating information to one or more individuals. The system 700 further includes at least one incident management system 710 that stores, analyses, and/or distributes data collected by the system 700.

The vehicles 701 may be and/or include at least one of the response vehicle 100, the response vehicle 204, the response vehicle 206, and/or the response vehicle 208. In some embodiments, the vehicles 701 include a firetruck or other fire vehicle associated with a fire department (e.g., a fire engine, a ladder truck, a pumper truck, a command vehicle, a tanker, a quint, etc.). In some embodiments, the vehicles 701 include another type of response vehicle associated with another emergency service. By way of example, a vehicle 701 may be an ambulance associated with a medical service or a police car associated with a police department. The vehicles 701 may include similar components and/or devices to that of the response vehicle 100, the response vehicle 204, the response vehicle 206, and/or the response vehicle 208. Similarly, components included in the vehicles 701 may perform similar functionality to that of the components and/or devices of the response vehicle 100, the response vehicle 204, the response vehicle 206, and/or the response vehicle 208.

In some embodiments, the system 700 designates one of the vehicles 701 as a primary vehicle, hub vehicle, or processing vehicle, and the remaining vehicles 701 act as secondary vehicles. The primary vehicle 701 acts as an information hub of the system 700, such that some or all of the data collected by the system 700 is transferred to the primary vehicle 701. The primary vehicle 701 may also perform some or all of the processing on the collected data (e.g., the processing of the incident management system 710). To facilitate this onboard processing, the processing capabilities of the primary vehicle 701 (e.g., of the processing circuit 712) may be greater than that of other devices that only collect and/or transfer data (e.g., the communication devices 707). In some embodiments, each of the vehicles 701 is equipped with similar hardware, such that each vehicle is capable of acting as the primary vehicle 701. The designation of a vehicle 701 as the primary vehicle 701 may be handled by the incident management system 710, by the server 705, by a user device 709, or otherwise designated. In other embodiments, the processing is distributed across multiple vehicles 701, communication devices 707, servers 705, and/or user devices 709.

As shown in FIG. 7A, each vehicle 701 includes at least one processing circuit 712. FIG. 7A illustrates the incident management system 710 as being hosted by (e.g., performed or executed on) the processing circuit 712 on one of the vehicles 701 (i.e., the primary vehicle). In other embodiments, the incident management system 710 is hosted one or more servers 705, communication devices 707, and/or user devices 709.

The processing circuit 712 includes at least one processor 715 and memory 720. Memory 720 may include one or more devices (e.g., RAM, ROM, Flash memory, hard disk storage) for storing data. Memory 720 may also store computer code and/or instructions for executing, completing and/or facilitating the various processes described herein. For example, memory 720 may store instructions and the instructions may cause the processors 715 to perform functionality similar to that of the incident management system 710 and/or a component thereof. Memory 720 may include non-transient volatile memory, non-volatile memory, and non-transitory computer storage media. Memory 720 may include database components, object code components, script components, or any other type of information structure for supporting the various activities and information structures described herein. Memory 720 may communicably couple with the processors 715. Memory 720 may also be electrically coupled with the processors 715. The processors 715 may be implemented as one or more application specific integrated circuits (ASICs), one or more field programmable gate arrays (FPGAs), a group of processing components, and/or other suitable electronic processing components.

The vehicle 701 further includes one or more communication interfaces, shown as communication component 725. The communication component 725 may include network communication devices, network interfaces, and/or other possible communication interfaces. The communication component 725 may include wired or wireless communications interfaces (e.g., jacks, antennas, transmitters, receivers, transceivers, wire terminals, etc.) for conducting data communications with sensors, devices, systems, etc., of the vehicle 701 and/or other external systems or devices (e.g., the server 705, the communication devices 707, the user device 709). The communication component 725 may be direct (e.g., local wired or wireless communications) and/or via a communications network (e.g., the network 703). For example, the communication component 725 may include an Ethernet card and port for sending and receiving data via an Ethernet-based communications link or network. The communication component 725 may also include a Wi-Fi transceiver for communicating via a wireless communications network (e.g., the network 703). The communication component 725 may include a power line communications interface. The communication component 725 may include an Ethernet interface, a USB interface, a serial communications interface, and/or a parallel communications interface. The communication component 725 may interface with, interact with and/or otherwise communicate with at least one of the sensors 751, the display device 755, the server 705, the communication devices 707, the user device 709, and/or any other possible component of the vehicle 701. Accordingly, the communication interface 725 may facilitate transferring data from external sources (e.g., the server 705, the user devices 709, the communication devices 707, etc.) to the incident management system 710.

As shown in FIG. 7A, each vehicle 701 further includes at least one sensor 751 and at least one display device 755 (e.g., a display). The components of the vehicle 701 and/or the components of the system 700 may be electrically coupled with one another. For example, the processing circuit 712 may be electrically coupled with the sensors 751. The components of the vehicle 701 and/or the components of the system 700 may also communicate with, interact with, and/or otherwise interface with one another via a controller area network (CAN). For example, processing circuit 712 may communicate, via a CAN, with one or more sensors 751, display devices 755, or communication devices 707.

The sensors 751 provide sensor data relating to the vehicle 701 (e.g., the status of the vehicle 701, the position of the vehicle 701, the surroundings of the vehicle, etc.). By way of example, the sensors 751 may include accelerometers, tachometers, speedometers, GPS devices/sensors, temperature sensors, voltmeters, ammeters, radar sensors, pressure sensors, tactile sensors, photodetectors, motion sensors, proximity sensors, and/or among other possible sensors and/or devices. The sensors 751 may provide, to the incident management system 710, operational data, status information (e.g., vehicle status data), and telemetry data associated with the vehicle 701.

In some embodiments, the sensors 751 provide data relating to a position or motion of the vehicle 701. By way of example, the sensors may include GPS sensors, accelerometers, or rotary speed sensor that provide a location of the vehicle 701 based on rotation of the tractive elements 146, a speed of the vehicle 701, or an acceleration of the vehicle 701. By way of another example, the sensors 751 may indicate a position of the vehicle 701 relative to another object or vehicle (e.g., using a distance sensor). In some embodiments, the sensors 751 provide data relating to movement and/or actions performed and/or pertaining to controllable/movable elements of the vehicle 701. By way of example, the sensors 751 may indicate if a door or hood of the vehicle 701 is open or closed. By way of another example, the sensors 751 may indicate a rotational position, angle of incline, or extension length of a ladder of a fire apparatus. By way of another example, the sensors 751 may indicate the current position of one or more outriggers of the vehicle 701.

The sensors 751 may also record, determine, and/or otherwise collect measurement data regarding a current status of the vehicle 701. By way of example, the sensors 751 may determine an amount of a fluid stored on the vehicle 701 (e.g., fire suppressant foam, water, etc.). By way of another example, the sensors 751 may measure a State of Charge (SoC) for batteries disposed on the vehicle 701. By way of another example, the sensors 751 may measure a fluid or electrical property, such as a flow rate or pressure (e.g., of water to be projected from a monitor) or a current or voltage (e.g., being delivered from a battery).

The sensors 751 may collect data associated with vehicle status, faults, diagnostics, and telemetry data associated with the vehicles 701. Systems of and methods for collecting and analyzing vehicle status, fault, diagnostic, and telemetry data are described in U.S. patent application Ser. No. 18/093, 600 filed on Jan. 5, 2023, the entirety of which is incorporated by reference herein.

The sensors 751 may include cameras. The cameras may be at least one of a video camera that captures video, a camera that captures images and/or among other possible optical instruments and/or optical devices that may capture, record, produce and/or otherwise provide videos and/or images (e.g., a LIDAR sensor). The cameras may also include audio devices. For example the cameras may include at least one of a speaker, a microphone, a headphone, and/or among other possible audio and/or sound devices. The camera may provide video data to the incident management system 710. The video data may include video feeds, images, recordings, audio files, audio signals and/or any other possible information that may be captured, produced and/or otherwise provided by the cameras.

The sensors 751 may be placed, located, situated, positioned, coupled and/or otherwise disposed on various components and/or locations on the vehicle 701. For example, a sensor 751 may be disposed on a front bumper of the vehicle 701. The information collected by the sensors 751 (e.g., image data regarding the surrounding environment) may be used by the incident management system 710 to create a graphical representation of a location proximate to an incident. For example, the incident management system 710 may collect image data provided by the sensors 751 to create, via a graphical user interface, a graphical representation of a location (e.g., an environment) proximate to a fire (e.g., the incident). The graphical representation of the environment proximate to the fire may include graphical representations of response vehicles (e.g., vehicles 701), first responders, components of the response vehicles, and/or pieces of equipment proximate to the fire.

In some embodiments, the incident management system 710 utilizes the sensors 751 to detect objects, such as obstacles (e.g., vehicles, pedestrians, traffic cones, debris on the road, etc.) or traffic indicators (e.g., traffic signals, traffic signs, etc.), in the current path of a vehicle 701. The sensors 751 may include one or more cameras that face in a forward direction of travel of the vehicle 701, capturing image data of an area in front of the vehicle 701 (e.g., in the current path of the vehicle 701). In some embodiments, the area extends at least 500 feet ahead of the front end of the vehicle 701. As the vehicle 701 travels in the forward direction, any obstacles or traffic signals in the area will approach the vehicle 701, which may require an operator to slow, stop, or change the course of the vehicle 701.

The incident management system 710 may perform image recognition on the image data from the sensors 751 to identify the presence of the obstacles and/or traffic indicators (e.g., traffic signals or traffic signs). The incident management system 710 may utilize artificial intelligence (e.g., a neural network) trained to identify visual characteristics (e.g., shapes, colors, reflectivities, etc.) of known obstacles and traffic signals. In some embodiments, the incident management system 751 may identify one or more vehicles (e.g., cars, trucks, bicycles, motorcycles, etc.), pedestrians, traffic cones, barriers, pieces of debris, traffic signals (e.g., stop lights or warning lights), and/or traffic signs (e.g., stop signs, yield signs, etc.). The incident management system 710 may additionally determine a position of the obstacle or traffic indicator relative to the vehicle 701 (e.g., a distance from the vehicle 701). By way of example, a correlation between an apparent size of a traffic sign (e.g., a number of pixels occupied by the traffic sign in the image data) and the distance to the traffic sign may be predetermined and used to calculate the distance to the traffic sign. The incident management system 710 may determine a status of the obstacle and/or traffic indicator. By way of example, the incident management system 710 may determine if a traffic signal is currently red, yellow, or green.

The incident management system 710 may provide a notification to the operator of the vehicle 701 based on the identified obstacle and/or traffic indicator. The notification may be visual (e.g., a light, a notification on a dashboard of the vehicle 701, etc.), audible (e.g., a buzzer or chime, etc.), and/or haptic (e.g., a vibration of a seat or a steering wheel). The notification may indicate to the operator of the vehicle 701 that they should begin reducing a speed of the vehicle 701 or steering the vehicle 701 to avoid an obstacle. The notification may vary based on the status of the obstacle or traffic indicator. By way of example, the notification may indicate that the vehicle should slow for a red traffic signal, a different notification may be provided for a yellow traffic signal, and no notification may be provided for a green traffic signal.

The criteria for providing the notification may be based on the identity, the location, and/or the status of the obstacle and/or traffic indicator. By way of example, the incident management system 710 may provide a notification in response to identifying a stop sign. By way of another example, the incident management system 710 may provide a notification in response to determining that an obstacle is within a threshold distance of the vehicle 701 (e.g., based on the current vehicle speed, the vehicle 701 will reach the obstacle in two seconds or less) and/or that the obstacle is approaching the vehicle at greater than a threshold speed.

In some embodiments, the incident management system 710 uses image data from the sensors 751 and/or image data from other sensors to identify an event, such as a visual indication of a fire (e.g., smoke, flames, etc.) in the area nearby the vehicle 701. Based on the image data, the incident management system 710 may determine a location of the fire. Based on the image data, the incident management system 710 may determine a status (e.g., a severity, size, or type of the fire). By way of example, the incident management system 710 may assess the size of the fire based on the size of the flame and/or the smoke identified in the image data. By way of another example, the incident management system 710 may determine a severity of the fire (e.g., a temperature of the flames) based on the color of the flames and/or the smoke provided in the image data. By way of another example, the incident management system 710 may determine a type of fire (e.g., what substance that is being burned, etc.) based on the color of the flames and/or the smoke provided in the image data. A relationship between (a) flame color and/or smoke color and (b) fire severity and/or fire type may be predetermined and stored by the incident management system 710. Any determined information regarding the status and/or location of the fire may automatically be shared to the other components of the system 700. In this way, all of the firefighters responding to an incident may be provided with up-to-date information about the fire and react accordingly.

The display devices 755 may be and/or include a screen, a monitor, a visual display device, a television, a video display, a liquid crystal display (LCD), a light emitting diode (LED) display, an infotainment system, a mobile device, and/or among other possible displays and/or devices. For example, the display device 755 may be an infotainment system disposed within a cab of the vehicle 701. In some embodiments, the display device 755 is a touchscreen configured to receive inputs from an operator. The display device 755 may be and/or include the display devices described herein. For example, the display device 755 may be the display unit 340. The display device 755 may also perform similar functionality to that of the display devices described herein.

The display device 755 may generate, produce, provide and/or otherwise display a user interface. For example, the display device 755 may display a user interface that includes video feeds provided by the sensors 751. The display device 755 may also display a user interface that includes graphical representations of a location proximate to an incident. The display device 755 may also display a user interface and an operator the display device 755 may input data (e.g., commands, selections, etc.) via the user interface. The display device 755 may provide the data inputted, via the user interface, to the incident management system 710. For example, the display device 755 may receive, via a user interface, data indicating where given sensors 751 of the sensors 751 have been disposed on the vehicle 701 and the display device 755 may provide the data to the incident management system 710. In other embodiments, the vehicle 701 includes other types of user interface devices, such as buttons, knobs, switches, sliders, microphones, or other input devices.

The network 703 may be and/or include a local area network (LAN), wide area network (WAN), telephone network (such as the Public Switched Telephone Network (PSTN)), Controller Area Network (CAN), wireless link, intranet, the Internet, a cellular network and/or combinations thereof. The user device 709 may be and/or include at least one of a mobile computing device, a desktop computer, a smartphone, a tablet, a smart watch, a smart sensor and/or any other device that may facilitate providing, receiving, displaying and/or otherwise interacting with content (e.g., webpages, mobile applications, etc.).

Components of the system 700 may automatically join the network 703 when in proximity to one another. Similarly, components of the system 700 may automatically leave the network 703 when moving away from one another. The connection status of each component may indicate a presence of the component at the scene of an incident. By way of example, if a vehicle 701 is known to be at a scene, and a communication device 707 is in communication with that vehicle 701 through a local network 703, the system 700 may indicate that the communication device 707 is also present at that scene.

An operator of the user device 709 may perform various actions and/or access various types of information. The information may be provided over the network 703 (e.g., the Internet, LAN, WAN, cellular, etc.). Similarly, the user device 709 may perform similar functionality to that of the display device 755. The user device 709 may include an application to receive information, display information, and receive user interactions with the content. For example, the application may be a web browser and/or a mobile application. The operator of the user device 709 may provide, via a user interface, data to the incident management system 710, the server 705, and the communication devices 707. For example, the operator of the user device 709 may provide, to the communication devices 707, data indicating a given entity (e.g., a component of a vehicle, a piece of equipment of the vehicle, an occupant of the vehicle, etc.) that has been linked to the communication devices 707.

The server 705 may be and/or include at least one of a remote device, an external database, a computing device, and/or among other possible computer hardware and/or computer software that may interface with, via the network 703, at least one of the vehicle 701, the communication devices 707, and/or the user device 709. By way of example, the server 705 may be or include at least one of a remote server 356 or a remote server 358. The server 705 includes at least one processing circuit 760. The processing circuit 760 includes at least one processor 765 and memory 770. The processing circuit 760 and/or the component thereof (e.g., the processors 765 and memory 770) may perform similar functionality to that of incident management system 710 and/or a component thereof. The server 705 may also include, store, maintain and/or otherwise host the incident management system 710. For example, the incident management system 710 may be remote and/or external to the vehicle 701 and the vehicle 701 may communicate with the incident management system 710. By way of another example, the incident management system 710 may be distributed across one or more servers (e.g., the server 705) and one or more vehicles (e.g., the vehicle 701). In some embodiments, the server 705 facilitates distribution of data from the system 700 to external systems (e.g., third party data hosting platforms, external user devices, etc.).

The communication devices 707 facilitate integration of other objects (e.g., vehicles, devices, components, etc.) and individuals (e.g., firefighters, medical professionals such as EMTs, law enforcement personnel such as police officers, etc.) into the system 700. Each communication device 707 may be a partially or completely self-contained module (e.g., the components of the communication device 707 may be contained within a common housing) that can be quickly and easily coupled to a device (e.g., through a bolted connection) or individual (e.g., through a harness). Accordingly, the communication devices 707 may provide a simple and cost-effective way to introduce additional data collection and monitoring capabilities into the system 700. A communication device 707 may be provided as a retrofit kit to facilitate aftermarket addition of an object or individual into the system 700. The communication devices 707 may communicate using a low energy Bluetooth connection to minimize power requirements. A communication device 707 may collect data relating to the object or individual to which the communication device 707 is coupled and transfer the collected data to the incident management system 710 (e.g., directly or indirectly).

As shown in FIG. 7A, the communication devices 707 each include at least one processing circuit 775, at least one power source 790, and at least one sensor 791. The components of the communication devices 707 may be electrically coupled with one another. The processing circuit 775 includes at least one processor 780 and memory 785. The processing circuit 775 and/or the components thereof (e.g., the processors 780 and memory 785) may perform similar functionality to that of the incident management system 710 and/or a component thereof. The power source 790 may provide power to the communication devices 707 and/or components thereof. For example, the power source 790 may provide power to the sensors 791. The power source 790 may include a connection to a power grid, generators, batteries, solar panels, and/or among other sources of electrical energy. The power source 790 may also be disposed on the vehicles 701. For example, the vehicles 701 may be electric vehicles, and a DC battery that supplies electrical energy to power an electric drive motor of the vehicles 701 may provide electrical energy to the communication devices 707. The sensors 791 may include the sensors 751 and/or the sensors 791 may perform similar functionality that that of the sensors 751.

The communication devices 707 may collect data from one or more data sources (e.g., sensors monitoring the object or individual to which the communication device 707 is coupled). For example, the communication devices 707 may be coupled with a plurality of vehicles (e.g., secondary vehicles 701) and the communication devices 707 may collect data produced by the secondary vehicles 701. For example, the communication devices 707 may collect, via the sensors 791, location information pertaining to the secondary vehicles 701. Alternatively, the vehicles 701 may include the sensors 751 that collect data, and the processing circuits 712 of those vehicles 701 may communicate the collected data to the incident management system 710.

The communication devices 707 may each be associated with (e.g., coupled to, configured to monitor, etc.) one or more objects or individuals. By way of example, a communication device 707 may be associated with a vehicle 701 (e.g., the first vehicle 701, a second vehicle 701, etc.). By way of another example, the communication devices 707 may be associated with an individual (e.g., a firefighter, a police officer, an EMT, etc.). The individual may or may not be associated with (e.g., an occupant of, an operator of) one of the vehicles 701.

The communication devices 707 may be associated with one or more specific components of one of vehicles 701, or one or more pieces of equipment. By way of example, a communication device 707 may be coupled to an element of a vehicle 701 (e.g., ladders, hoses, turrets, doors, hydraulics, actuators, and/or among other possible moveable elements). The communication device 707 may be arranged to collect data related to that particular component of the vehicle. By way of another example, the communication devices 707 may be associated with other equipment (e.g., hoses, axes, oxygen tanks, portable tools, gurneys, medical devices, etc.). The equipment may or may not be associated with (e.g., stored on, used by, etc.) a specific vehicle 701.

The communication devices 707 may collect data describing the associated object or individual. The communication devices 707 may provide the collected data, via the network 703, to at least one of the vehicle 701, the incident management system 710, the server 705 and/or the user device 709. The incident management system 710 may store a database correlating each communication device 707 with an associated object or individual. By way of example, this correlation may be manually determined and provided to the incident management system when initially setting up each communication device. The incident management system 710 may then associate any data provided by the communication device 707 with the corresponding object or individual. For example, the communication devices 707 may be disposed on occupants of the plurality of second vehicles 701 and the communication devices 707 may provide data pertaining to the occupants. The data, provided by the communication devices 707, pertaining to the occupants may include location information of the occupants (e.g., where the occupants are located relative to one another while present at the location proximate to the incident, where the occupants are located in space around the location proximate to the incident, etc.).

In some embodiments where a communication device 707 is configured to be associated with (e.g., coupled to) an individual, the sensors 791 are configured to measure information regarding the individual. By way of example, the sensor 791 may measure health data, such as body temperature, blood pressure, heart rate, blood oxygen content, or other information. By way of another example, the sensors 791 may measure environmental data characterizing the environment around the individual, such as the temperature, humidity, barometric pressure, air quality (e.g., smoke content), or other information. By way of another example, the sensor 791 may indicate a current location of the individual (e.g., the absolute position of the individual, the position of the individual relative to a vehicle, whether or not the individual is within a building, the altitude of the individual, etc.).

As shown in FIG. 7A, the incident management system 710 includes a location tracker 730, a vehicle manager 735, and at least one database 740. The location tracker 730 is configured to use collected data determine the location of objects or individuals within the system 700. The vehicle manager 735 is configured to analyze and categorize the various sources of data available to the incident management system 710. The database 740 is configured to store data within the system.

The location tracker 730 may be incorporated into (e.g., a function of) the processing circuit 712, or the location tracker 730 may be a function of another processing circuit within the system 700. The location tracker 730 may receive, from the communication component 725, data generated by the vehicle 701 and/or the communication devices 707. For example, the location tracker 730 may receive data collected by the sensors 751 and/or the sensors 791. By way of another example, the data utilized by the location tracker 730 may include location information (e.g., GPS coordinates, positional data, etc.) that are collected by the sensors 751 and/or the sensors 791. By way of another example, the data may include the strength of a connection between two components. According to one such example, a communication device 707 may be in wireless communication with a vehicle 701. If the strength of a communication signal between the communication device 707 and the vehicle 701 decreases, the vehicle 701 and an object associated with the communication device 707 may be identified as moving away from one another. A lack of a communication signal may indicate that the object and the vehicle 701 are positioned remote from one another.

The location tracker 730 may determine, using the data generated by the vehicle 701, a location of the vehicle 701, an object associated with a communication device 702, or an individual associated with a communication device 707. The determined location may be absolute (e.g., relative to the Earth) or relative (e.g., relative to the first vehicle 701). The location of the vehicle 701 may be proximate to an incident or scene (e.g., a fire, an accident, etc.). For example, the location tracker 730 may determine that the vehicle 701 is located and/or otherwise positioned proximate to a fire. The location tracker 730 may receive, from the communication component 725, information pertaining to the incident. For example, the location tracker 730 may receive an address of a building that is currently experiencing a fire. The location tracker 730 may, using the address of the building and the data generated by the vehicle 701, determine that the vehicle 701 is proximate to the building experiencing the fire. For example, the location tracker 730 may determine that the vehicle 701 is parked in front of the building. The location tracker 730 may provide, to the vehicle manager 735, the location of the vehicle 701 and the location of the incident.

The location tracker 730 may be utilized to prevent unintentionally leaving equipment behind when leaving a location (e.g., a vehicle depot (e.g., a fire house), a staging area, the scene of an incident, etc.). While responding to an incident, equipment may be removed from a vehicle 701 or personnel so that the equipment can be used (e.g., ladders removed from a vehicle 701, tools removed from pockets in the clothing of personnel, etc.). Similarly, the equipment may be removed from a vehicle 701 or personnel when positioned at a vehicle depot (e.g., for maintenance, cleaning, or storage). In either instance, there is a chance that the removed equipment may be left at the scene of the incident or at the depot when the vehicle 701 and the personnel leave the area, unless a member of the personnel remembers to retrieve the equipment.

To prevent unintentionally leaving equipment behind, each piece of equipment may be outfitted with (e.g., fixedly coupled to) a communication device 707. The incident management system 710 may associate each communication device 707 with an individual and/or a vehicle 701. The location tracker 730 may track the relative locations of the communication devices 707, the individuals (e.g., through their assigned communication devices 707 and/or user devices 709), and the vehicles 701. Based on the relative locations, the location tracker 730 may determine whether or not the equipment is likely to left behind by the associated individual or vehicle 701. By way of example, the location tracker 730 may determine that a piece of equipment is likely to be left behind in response to a determination that the piece of equipment is greater than a threshold distance (e.g., 100 feet) from the associated individual or vehicle 701. By way of example, the location tracker 730 may determine that a piece of equipment is likely to be left behind in response to a determination that the piece of equipment is moving away from the associated individual or vehicle 701 at greater than a threshold speed (e.g., 5 mph). By way of example, the location tracker 730 may determine that a piece of equipment is likely to be left behind in response to a determination that the piece of equipment is greater than a threshold distance from the associated individual or vehicle 701 and moving away from the associated individual or vehicle 701 at greater than a threshold speed. By way of another example, the location tracker 730 may determine that a piece of equipment is likely to be left behind in response to a determination that one or more of the piece of equipment, the associated individual, or the associated vehicle 701 have disconnected from the local area network or otherwise left the scene.

In response to a determination that the piece of equipment is likely to be left behind, the incident management system 710 may provide a notification to a user (e.g., through a user device 709, through a user interface of a vehicle 701, etc.). The notification may instruct the user to check for missing equipment before leaving the area. The notification may include an identity of the piece of equipment that is likely to be left behind. Additionally or alternatively, the notification may include a current location of the piece of equipment. Based on the notification, the user may act to avoid loss of the equipment. This functionality would provide a similar benefit in a situation where non-associated personnel are leaving with a piece of equipment (e.g., the equipment is being stolen). The notification would alert the user that the piece of equipment is moving away unexpectedly and allow the user to track the current location of the piece of equipment.

The vehicle manager 735 may be incorporated into (e.g., a function of) the processing circuit 712, or the location tracker 730 may be a separate processing circuit within the incident management system 710. In some embodiments, the vehicle manager 735 is configured to use available data to determine which vehicles, objects, or individuals are present at a scene of an incident. The vehicle manager 735 may be constantly in communication with a variety of different data sources, some of which may not be present at the incident (e.g., may be in storage, parked at a garage, or otherwise inactive, may be present at the scene of another incident, etc.). By distinguishing which data sources are present at the incident, the incident management system 710 may determine which data are relevant to that particular incident. The vehicle manager 735 may receive, from the location tracker 730, the location of the vehicle 701 and the location of the incident. By comparing the location data with the location of the incident, the vehicle manager 735 may identify one or more data sources located proximate to the incident. For example, the data received from the communication devices 707 may include vehicle identifiers and location data pertaining to the plurality of second vehicles. The vehicle manager 735 may determine a first subset of vehicles 701 that are present at the incident, and a second subset of vehicles that are positioned remote from the incident. For example, the vehicle manager 735 may determine that firetrucks, police vehicles and ambulances are located proximate to the incident.

The vehicle manager 735 may generate, responsive to determining one or more data sources located proximate to the incident, one or datasets pertaining to those data sources. For example, the vehicle manager 735 may receive, from the communication component 725, a continuous and/or semi-continuous stream of data, and the vehicle manager 735 may separate, parse, and/or otherwise sort the data based on respective vehicles 701, object, or individual associated with the received data. The vehicle manager 735 may generate, for each respective data source, at least one dataset. The datasets may include the information that is generated by, associated with and/or otherwise linked to a respective data source. For example, a first dataset generated by a vehicle 701 may include data identifying a number of occupants associated with the vehicle 701, a vehicle type of the vehicle 701 (e.g., the vehicle 701 is a tanker truck), measurement data (e.g., an amount of water remaining in the tanker truck), and/or among other possible data. Alternatively, the vehicle manager 735 may initially sort all of the incoming data by data source, then subsequently filter the data based on whether or not the identified data is present proximate a given incident.

The vehicle manager 735 may tag, identify, or otherwise update each dataset to include one or more identifiers that identify the source of the data. The identifiers may include vehicle identifiers that associate the data with a specific vehicle, component identifiers that associate the data with a specific component, individual identifiers that associate the data with a specific individual (e.g., a person), equipment identifiers that associate the data with a specific piece of equipment, and/or other identifiers. By way of example, a dataset transferred to the vehicle manager 735 may identify the communication device 707 that generated the data, or the vehicle 701 that generated the data. An association between each data source and one or more identifiers may be predetermined and stored by the incident management system 710. The plurality of identifiers may provide indications of a given data source and/or an entity associated with the data source. For example, a dataset generated by a communication device 707 associated with a vehicle 701 may include data pertaining to a component of the second vehicle 701 (e.g., a ladder, a water tank, etc.), and the vehicle manager 735 can update the dataset to include a component identifier associated with that component and a vehicle identifier associated with that vehicle 701.

In some embodiments, the individual identifier may be either a personnel identifier or a civilian identifier. A personnel identifier may indicate that the associated individual belongs to (e.g., is employed or otherwise affiliated with) an agency of the system 700. A civilian identifier may indicate that the associated individual is not affiliated with an agency of the system 700. By way of example, a civilian identified by a civilian identifier may be a patient recovered from a scene of an incident and being provided medical care by a medical service.

The updating of the datasets to include the identifiers provides indications of where the data originated and allows for the datasets to be transmitted and utilized accordingly. For example, a dispatcher orchestrating vehicle placement at the location proximate to the incident may benefit from receiving datasets for respective vehicles present at the location proximate to the incident. The dispatcher may use the information indicating which vehicles are present at the location proximate to the incident to determine if expected vehicles have arrived.

Additionally or alternatively, the identifiers may include an agency identifier that identifies an agency associated with the data source. Each vehicle, individual, component, or piece of equipment may belong to (e.g., be employed by, be owned by, etc.) a particular agency. The agency identifier may identify a type of agency (e.g., police, fire, medical, military). The agency identifier may identify an organization (e.g., a governmental body, a private company, etc.). The agency identifier may identify a location or area (e.g., a country, city, state, county, township, village, predetermined geographic boundary, etc. that is serviced by the agency). An association between each data source and one or more agency identifiers may be predetermined and stored by the incident management system 710.

By way of example, a dataset received by the incident management system 710 may be associated with a firetruck (e.g., a vehicle 701). The firetruck may be associated with a fire department and a municipality. The server 705 may identify one or more datasets that pertain to vehicles associated with the firetruck (e.g., vehicles at the same scene as the firetruck, part of the same agency as the firetruck, etc.). The server 705 may determine that the firetruck is part of a fleet for a given department and the server 705 may determine one or more other vehicles that are also a part of the fleet for the given department. The server 705 may associate the dataset pertaining to the firetruck with the one or more second datasets of the plurality of datasets that pertain to the one or more second vehicles.

The vehicle manager 735 may provide the datasets and the corresponding identifiers to the communication component 725. The communication component 725 may, responsive to communicating with the vehicle manager 735, communicate with the server 705. The communication component 725 may transmit, to the server 705, the datasets and the corresponding identifiers. The server 705 may store, transmit, and/or analyze the datasets and the identifiers.

The communication component 725 may receive, from a communication device 707 or a vehicle 701, a dataset indicating that one of the data sources (e.g., a vehicle 701, a communication device 707 associated with an individual, etc.) is leaving (e.g., ready to leave, in the process of leaving, or already left, etc.) the location proximate to the incident (i.e., a scene). In some embodiments, a determination that a data source is leaving is provided by a communication device 707 or a vehicle 701. By way of example, the communication device 707 may provide the dataset responsive to an operator selecting at least one of an icon displayed on a user interface and/or a button disposed on a communication device 707. In some embodiments, a determination that a data source is leaving is provided by the incident management system 710. By way of example, the location tracker 730 may analyze the location of each vehicle 701 and determine that a vehicle 701 is leaving the scene, and in response the vehicle manager 735 may identify data having corresponding identifiers (e.g., a vehicle identifier corresponding to the vehicle 701 that is leaving). The dataset may include information associated with the vehicle 701 (e.g., information from a sensor 791 or a sensor 751). The dataset may include at least one of an identifier, information identifying a destination, information identifying one or more occupants of a vehicle 701 that is departing, and/or information identifying one or more pieces of equipment associated with a vehicle 701 that is departing. The communication component 725 may provide, to the vehicle manager 735, an indication that the data source is set to leave and the related dataset.

In response to the indication that an object or individual is set to leave, the vehicle manager 735 may generate a message indicating that the object or individual is set to leave the scene. The vehicle manager 735 may provide the message to the communication component 725. The communication component 725 may transmit, to the server 705, the message including the indication that the first vehicle 701 of the plurality of second vehicles 701 is set to leave the location proximate to the incident. Additionally or alternatively, the vehicle manager 735 may provide the message to a user device 709. In some embodiments, the server 705 additionally or alternatively performs the determination of whether or not a data source is leaving a scene.

The server 705 may determine, responsive to identifying the plurality of second vehicles located proximate to the incident, a plurality of Application Program Interfaces (APIs) associated with the plurality of second vehicles. For example, the plurality of second vehicles located proximate to the incident may be associated with one or more departments or other interoperable agencies (e.g., fire departments, police departments, medical services, etc.) and the one or more departments may be associated with a municipality (e.g., a city, a town, a county, etc.). Additionally or alternatively, the second vehicles may be associated with one or more service providers (e.g., third party service providers such as the vehicle manufacturer, a maintenance service, or other organizations involved with fleet management). The one or more departments and/or the municipality may be enrolled in, associated with, and/or otherwise linked to at least one API. The server 705 may determine for the plurality of second vehicles a plurality of APIs.

In some embodiments, the server 705 utilizes a maintenance data API to communicate with a maintenance provider (e.g., a third party service provider, a maintenance department of an organization that owns and/or operates the response vehicle 100, etc.). The maintenance data API may be used to transfer vehicle status data, a current health of one or more components, fault codes associated with any known failures, predicted data regarding the failure of one or more components, and/or other data.

The server 705 may receive, from a remote device, an API call. The remote device may be at least one of the incident management system 710, a second server 705, the communication devices 707 and/or the user device 709. The API call may include a request for given information pertaining to the plurality of second vehicles 701. The server 705 may determine, using the API, a first vehicle of the plurality of vehicles for which data has been requested. For example, the API call may request information pertaining to a given firetruck located proximate to the incident. The server 705 may transmit, to the remote device, a first dataset of the plurality of datasets. The first dataset of the plurality of datasets may pertain to the first vehicle of the plurality of vehicles. The server 705 may transmit the first dataset responsive to validating the API call and/or the remote device.

The server 705 may receive, from a second remote device, a second API call requesting data pertaining to the first vehicle of the plurality of second vehicles. The second remote device may be the remote device described above and/or the second remote device may be a different remote device. The second API call may include credentials of a user associated with the second remote device. For example, an operator of the user device 709 (e.g., the second remote device) may provide log-in credentials and the log-in credentials may establish permissions for the operator of the user device 709. The server 705 may determine, using the credentials of the user associated with the second remote device, one or more subsets of the first dataset of the plurality of datasets for which the user is authorized to access. The server 705 may transmit, to the second remote device, the one or more subsets of the first dataset.

The server 705 may generate, responsive to receiving the plurality of datasets pertaining to the plurality of second vehicles, a graphical representation of the location proximate to the incident. For example, the plurality of datasets pertaining to the plurality of second vehicles may include data collected and/or produced by the sensors 751 and the server 705 may generate a virtual environment (e.g., the graphical representation of the location proximate to the incident) of the incident. The graphical representation of the location proximate to the incident may include at least one of a plurality of graphical representations illustrating the plurality of second vehicles, a plurality of graphical representations illustrating a plurality of occupants associated with the plurality of second vehicles, a plurality of graphical representations illustrating a plurality of components of the plurality of second vehicles, and/or a plurality of graphical representations illustrating a plurality of pieces of equipment associated with the plurality of second vehicles.

The server 705 may identify, using the plurality of datasets pertaining to the plurality of second vehicles, an organization associated with at least one vehicle of the plurality of second vehicles. For example, the server 705 may identify that the at least one vehicle of the plurality of second vehicles is associated with a fire department. The server 705 may determine, responsive to identifying the organization, a user device associated with the organization. For example, the server 705 may determine that the user device 709 is associated with the fire department. The server 705 may transmit, for display via a graphical user interface on the user device, the graphical representation of the location proximate to the incident to the user device. For example, the server 705 may transmit, to the user device 709, the graphical representation of the location proximate to the incident and the server 705 transmitting the graphical representation may cause the user device 709, via graphical user interface, to display the graphical representation.

Network Configuration

Figure 7B:
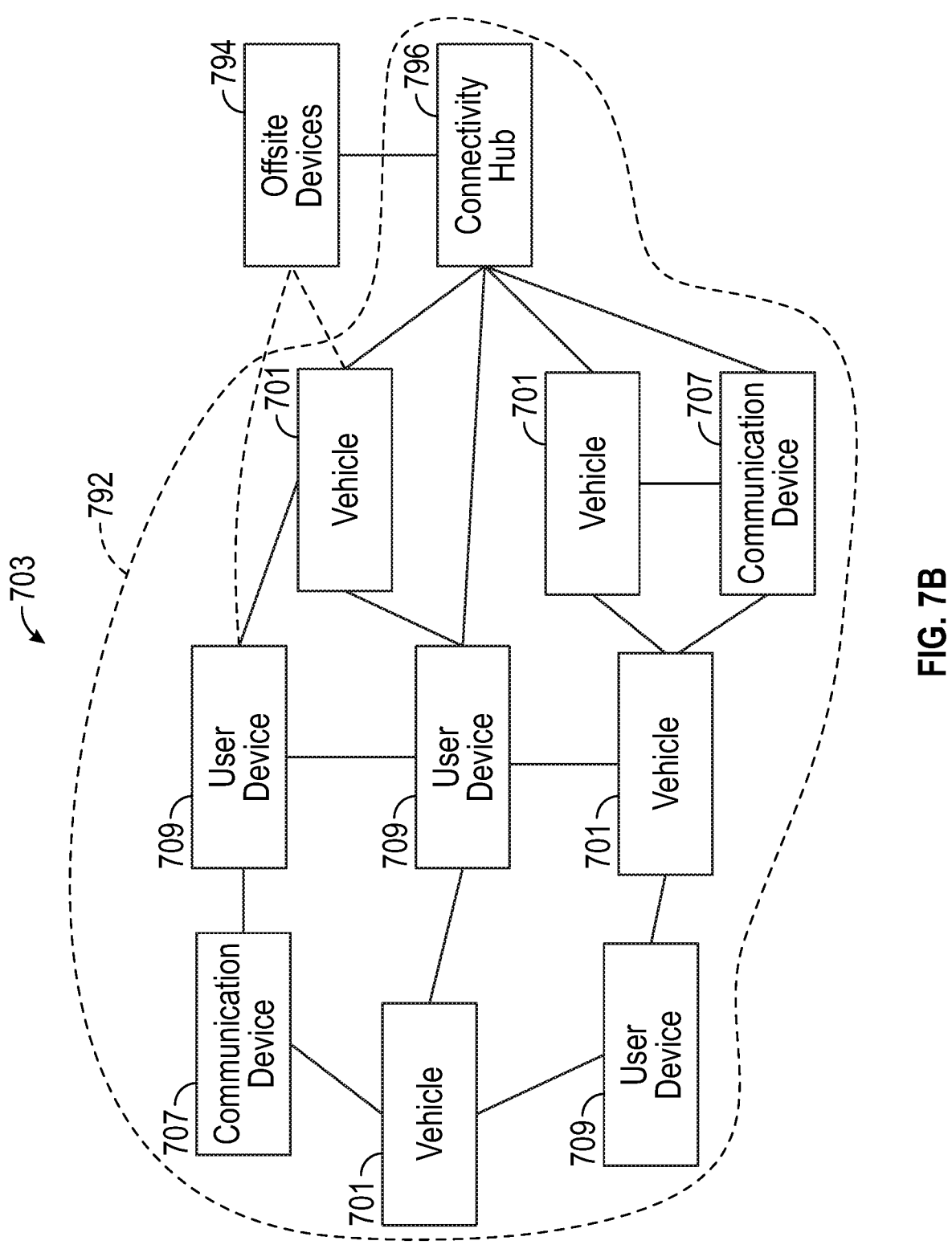
FIG. 7B is a block diagram of a network of the system of FIG. 7A, according to an exemplary embodiment.

Referring to FIG. 7B, the network 703 is shown according to an exemplary embodiment. As shown, a portion of the network 703 includes onsite devices, shown as local devices 792, that are present in a group at a location of interest (e.g., at the scene of an incident such as a fire or vehicle collision, etc., at a staging area for the vehicles 701, at a firehouse or other vehicle depot, etc.) and offsite devices 794 (e.g., cloud devices) that are positioned remote from the location of interest (e.g., at a remote data storage facility, at a fire station, at a hospital, etc.). The local devices 792 may include one or more portable repeaters 214, vehicles 701, communication devices 707, and/or user devices 709. The offsite devices 794 may include one or more vehicles 701, servers 705, communication devices 707, and/or user devices 709.

As shown in FIG. 7B, the local devices 792 may communicate with one another to form a mesh network that serves as a local area network. The local area network may be used to transfer any of the data discussed herein (e.g., vehicle status data, diagnostics data, telemetry data, commands, etc.). When two local devices 792 that are required to communicate with one another are within range of one another, the two local devices 792 may communicate directly. When two local devices 792 that are required to communicate with one another are out of direct communication range, the two local devices 792 may communicate indirectly through one or more other local devices 792 that are in communication range. The local devices 792 evaluate and share the statuses of the various connections to facilitate identifying possible data transmission routes. By way of example, a first vehicle 701 may determine that it is in direct communication with a second vehicle 701, and a user device 709 may determine that it is also in direct communication with the second vehicle 701 but unable to communicate directly with the first vehicle 701. To communicate with the first vehicle 701, the user device 709 may provide data to the second vehicle 701 along with an instruction to transfer the data to the first vehicle 701. Accordingly, the mesh network may facilitate communication between local devices 792 that may not be in range for direct communication.

In some embodiments, the local devices 792 automatically connect with one another to form the local area network when in proximity to one another (e.g., within a threshold distance, close enough to form a stable wireless connection, etc.). As other local devices 792 come within range of one or more of the local devices 792, the new local devices 792 may be automatically added to the local area network, growing the range of the mesh network. Similarly, the local devices 792 may automatically leave the local network when moving away from one another (e.g., when out of communication range of the other local devices 792). The mesh network may remain (e.g., continue to pass information between local devices 792) as long as at least two of the local devices 792 are within communication range. The mesh network may remain even if the local devices 792 that originally formed the mesh network have both left the mesh network.

In some embodiments, the system 700 designates one of the local devices 792 as a primary device, hub device, or processing device, and the remaining local devices 792 act as secondary devices. The primary device acts as an information hub of the system 700, such that some or all of the data collected by the system 700 is transferred to the primary device. The primary device may also perform some or all of the processing on the collected data (e.g., the processing of the incident management system 710). In some embodiments, two or more of the local devices 792 are equipped with similar hardware, such that each is capable of acting as the primary device. The designation of a local device 792 as the primary device may be handled by the incident management system 710, by the server 705, by a user device 709, or otherwise designated. In some embodiments, only certain types of local devices 792 can be designated as primary devices. By way of example, designation as the primary device may be limited to vehicles 701 and portable repeaters 214 (e.g., due to a minimum processing power requirement).

In some embodiments, designation of the primary device is based on a hierarchy, rank, or command position of an associated individual or agency. In one example, the system 700 designates personnel as commanders (e.g., a highest rank such as a fire chief), lieutenants (e.g., an intermediate rank), and subordinates (e.g., a lowest rank). Within the mesh network, the local device 792 associated with the individual or agency having the highest rank may automatically be designated as the primary device. By way of example, if a local device 792 associated with a commander is present, that device may automatically be designated as the primary device. If a local device 792 associated with the commander is not present or leaves the mesh network, a local device 792 associated with a lieutenant may be designated as the primary device. If a local device 792 associated with the lieutenant is not present or leaves the mesh network, a local device 792 associated with a subordinate may be designated as the primary device. Accordingly, the mesh network may have one device designated as a primary device at all times. Similarly, if a local device 792 associated with an agency having a primary charge designation is present, that device may be designated as the primary device. If a local device 792 associated with the agency having the primary charge designation is not present or leaves the mesh network, a local device 792 associated with a different agency having a secondary charge designation may be designated as the primary device.

In some embodiments, one of the local devices 792 serves as a connectivity hub 796. In some embodiments, the primary device serves as the connectivity hub 796. In other embodiments, the connectivity hub 796 is a secondary device. The connectivity hub 796 may facilitate communication between one or more of the local devices 792 and the offsite devices 794. The connectivity hub 796 may facilitate communication between local devices 792 and the offsite devices 794 when the local devices 792 are unable to perform such communications directly. In some embodiments, the local devices 792 utilize a first communication protocol or type of communication (e.g., Bluetooth, CAN, radio, Wi-Fi, etc.) to communicate between one another, and a second communication protocol or type of communication (e.g., a cellular connection, over the Internet, etc.) is used for communications between the local devices 792 and the offsite devices 794. The connectivity hub 796 may then act as a communications bridge, facilitating communication between the offsite devices 794 and the local devices 792 that lack the ability to use the second communication protocol. Additionally or alternatively, some of the local devices 792 may be configured to bypass the connectivity hub 796 and communicate directly with the remote offsite devices 794.

In some embodiments, a portable repeater 214 acts as the connectivity hub 796. The portable repeater 214 may be transported to the scene onboard a vehicle 701 and deployed by an individual. Once deployed, the portable repeater 214 may be dedicated to function as the connectivity hub 796 for any other (e.g., one or more) local devices 792 present at the scene. By providing a portable repeater 214, the functionality of the connectivity hub 796 can be guaranteed without requiring a vehicle 701 to be present on the scene at all times.

In some embodiments, the connectivity hub 796 and/or the primary device broadcast a unique site identifier or scene identifier to the other local devices 792 of the mesh network. The scene identifier may identify the local devices 792 as all belonging to the same mesh network. By way of example, a local device 792 may utilize the scene identifier to determine which other devices are present at the same scene and within the same mesh network by comparing the respective scene identifiers.

Third-Party Integration

Figure 8:
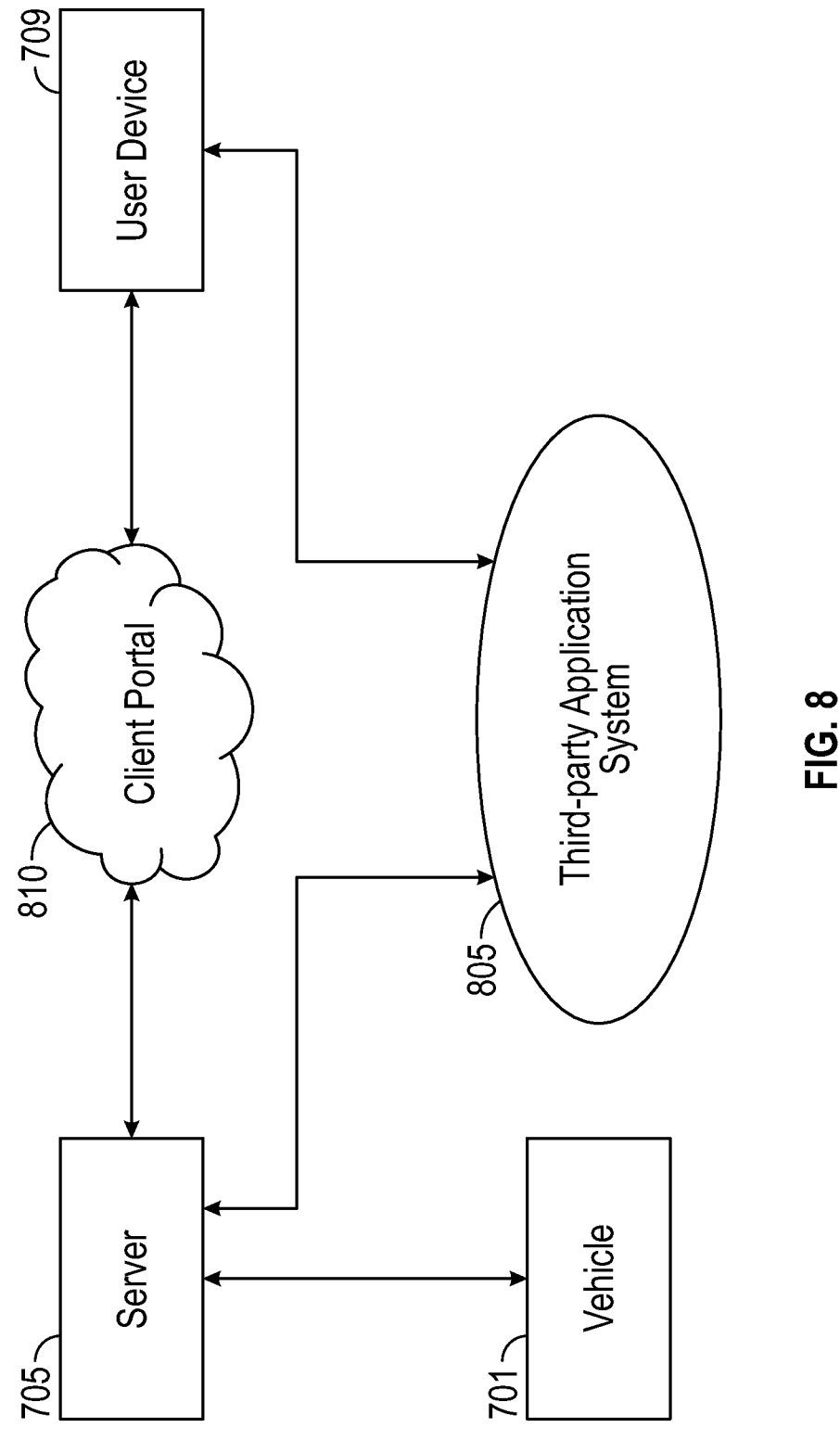
FIG. 8 is a block diagram of a system, according to an exemplary embodiment.

FIG. 8 depicts a block diagram of a system 800, according to an exemplary embodiment. The system 800 may include the vehicle 701, the server 705, the user device 709, at least one third-party application system 805, and at least one client portal 810. FIG. 8 depicts an example of data transmission between the interconnected devices. For example, the vehicle 701 may transmit data to the server 705 and the server 705 may transmit data to the vehicle 701. The server 705 may transmit, via the client portal 810, data to the user device 709 and the user device 709 may transmit, via the client portal 810, data to the server 705. The server 705 may transmit data to the third-party application system 805 and the third-party application system 805 may transmit data to the server 705. The third-party application system 805 may transmit data to the user device 709 and the user device 709 may transmit data to the third-party application system 805.

The server 705 may receive, from the vehicle 701, information pertaining to one or more vehicles (e.g., the plurality of second vehicles 701) located proximate to an incident. The information may include telemetry data, status of the incident, locational data pertaining to the one or more second vehicles, and/or among other possible types of information. The third-party application system 805 may streamline, supervise, integrate, and/or otherwise orchestrate communication between the server 705 and the user device 709. For example, the third-party application system 805 may be directly associated with, integrated with, and/or otherwise linked with the user device 709. For example, the third-party application system 805 may include a cloud computing device and the user device 709 may have a subscription to interact with the cloud computing device. The third-party application system 805 either by itself and/or with the user device 709 may be associated with the server 705. For example, the server 705 may use the third-party application system 805 as a remote database.

The third-party application system 805 may track, tally, document, and/or otherwise monitor API calls and/or API responses between the server 705 and the user device 709. The third-party application system 805 may generate reports including the API interactions (e.g., the API calls and the API responses). The reports may be generated at one or more periods in time. For example, the reports may be generated at the end of every month, every two weeks, every day, every hour, and/or among other possible periods in time. The reports may be vehicle specific (e.g., one or more reports pertaining to API interactions associated with a given vehicle 701), department specific (e.g., one or more reports pertaining to API interactions associated with a given department), user specific (e.g., one or more reports pertaining to API interactions associated with a given user and/or a given user device 709). The reports may track data access patterns, data utilization, and/or data integration. The reports may be used, by the third-party application system 805, to generate invoices associated with accessing, utilizing and/or otherwise interacting with the data provided by the vehicle 701 and/or the server 705.

Figure 9:
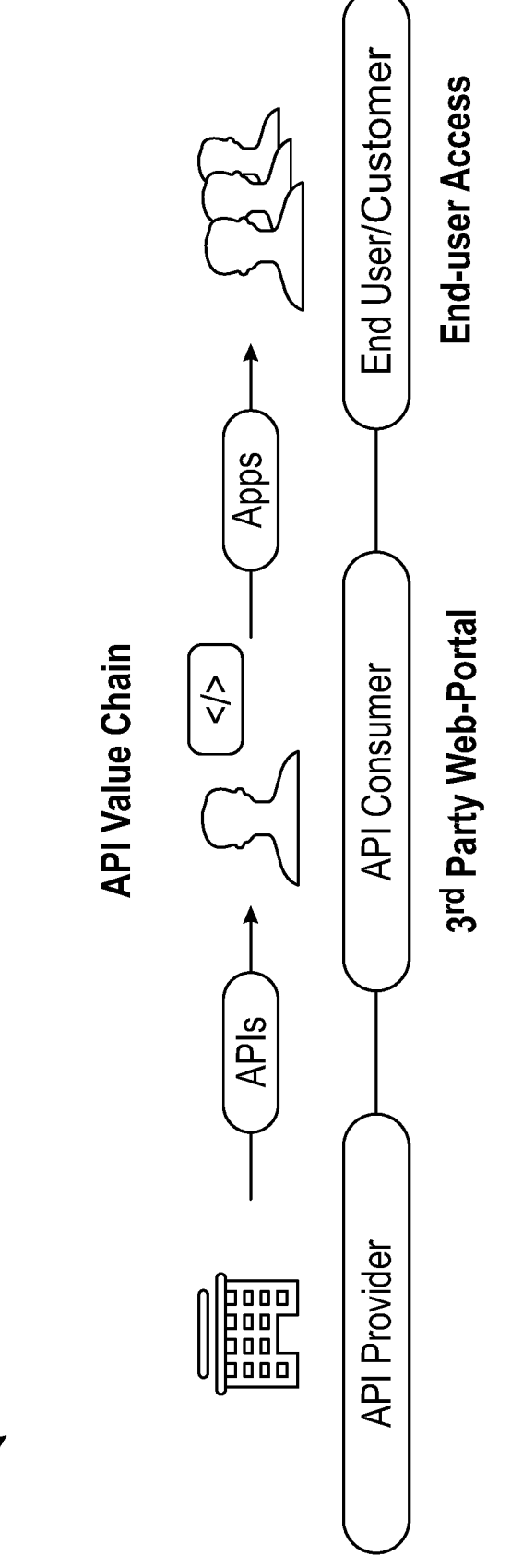
FIG. 9 is an Application Program Interface (API) Model, according to an exemplary embodiment.

FIG. 9 depicts an Application Program Interface (API) model 900, according to an exemplary embodiment. The API model 900 may include at least one API provider, at least one API consumer, and at least one end user. The API provider may be and/or include the server 705. The API consumer may be and/or include the third-party application system 805. The end user may be and/or include users associated with at least one of the vehicle 701, the communication devices 707, and/or the user devices 709. The API model 900 may include and/or provide a value chain. The value chain may include the API provider creating and/or providing APIs to the API consumer. The value chain may also include the API consumer implementing the APIs provided by the API provider. The value chain may also include the end user utilizing the APIs implemented by the API consumer. The API consumer may track, monitor, and/or otherwise document an amount of API calls performed by the end user. The API consumer may generate reports for the end users including the amount of API calls performed by the end user. The end user and the API consumer may interact with, interface with, and/or otherwise communicate by at least one of an application on the user device 709, a web portal hosted by the API consumer, Short Message/Messaging Service (SMS) communication, and/or among other possible communication methods.

Figure 10:
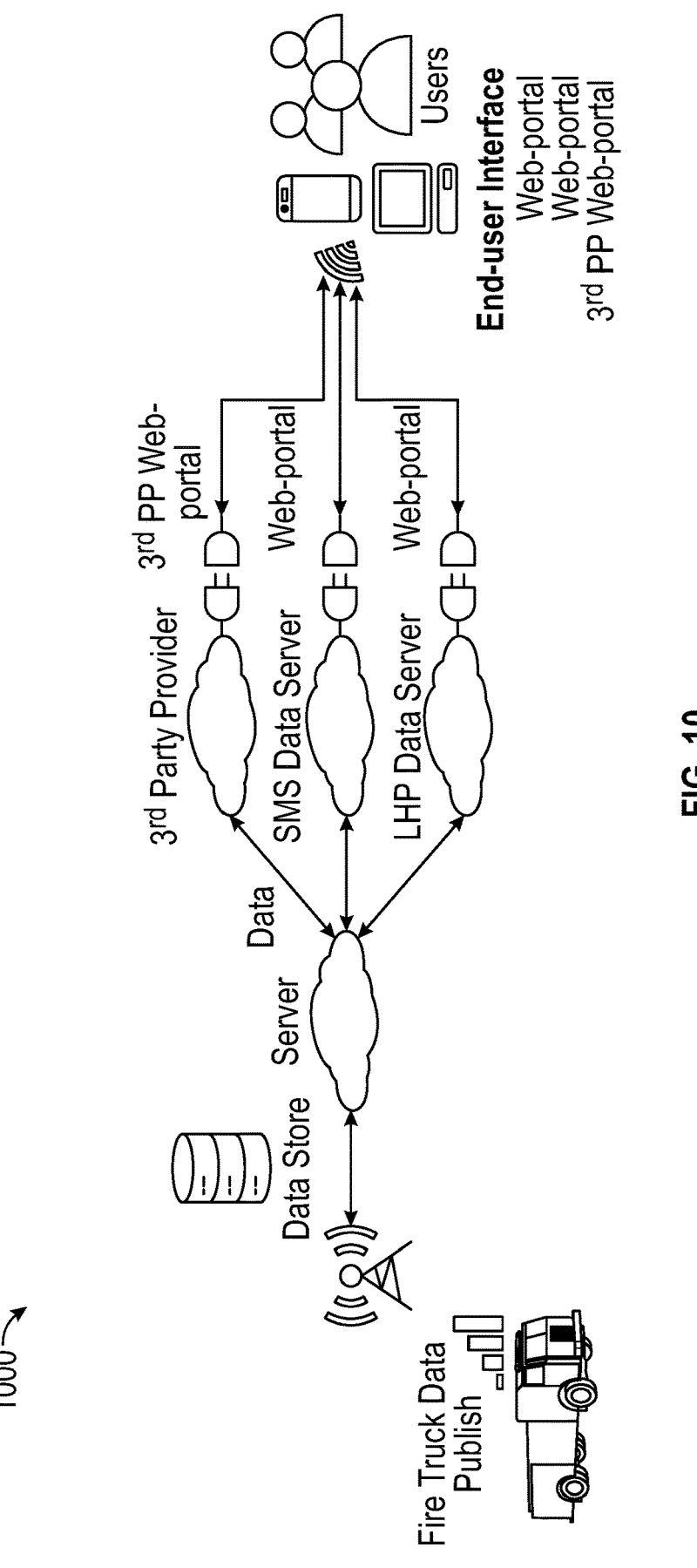
FIG. 10 is a block diagram of interconnected devices, according to an exemplary embodiment.

FIG. 10 depicts a block diagram of a system 1000 including a plurality of interconnected devices, according to an exemplary embodiment. The system 1000 may include at least one vehicle (e.g., the vehicle 701), at least one data store (e.g., the server 705), at least one third-party provider (e.g., the third-party application system 805), and at least one end-user interface. The vehicles and the data store may communicate via a network (e.g., the network 703). The vehicles may transmit, to the data store, information pertaining to the vehicles. For example, the vehicles may transmit telemetry data to the data store. The data store may maintain, store, and/or otherwise keep the information received from the vehicles. The data store may provide, responsive to receiving at least one API call, the information received from the vehicles to the third-party provider. The third party provider may, via at least one of web-portals and/or SMS messages, provide the information received from the vehicles to the end user interface. The end user interface may display, via a graphical user interface, the information received from the vehicles.

Figure 11:
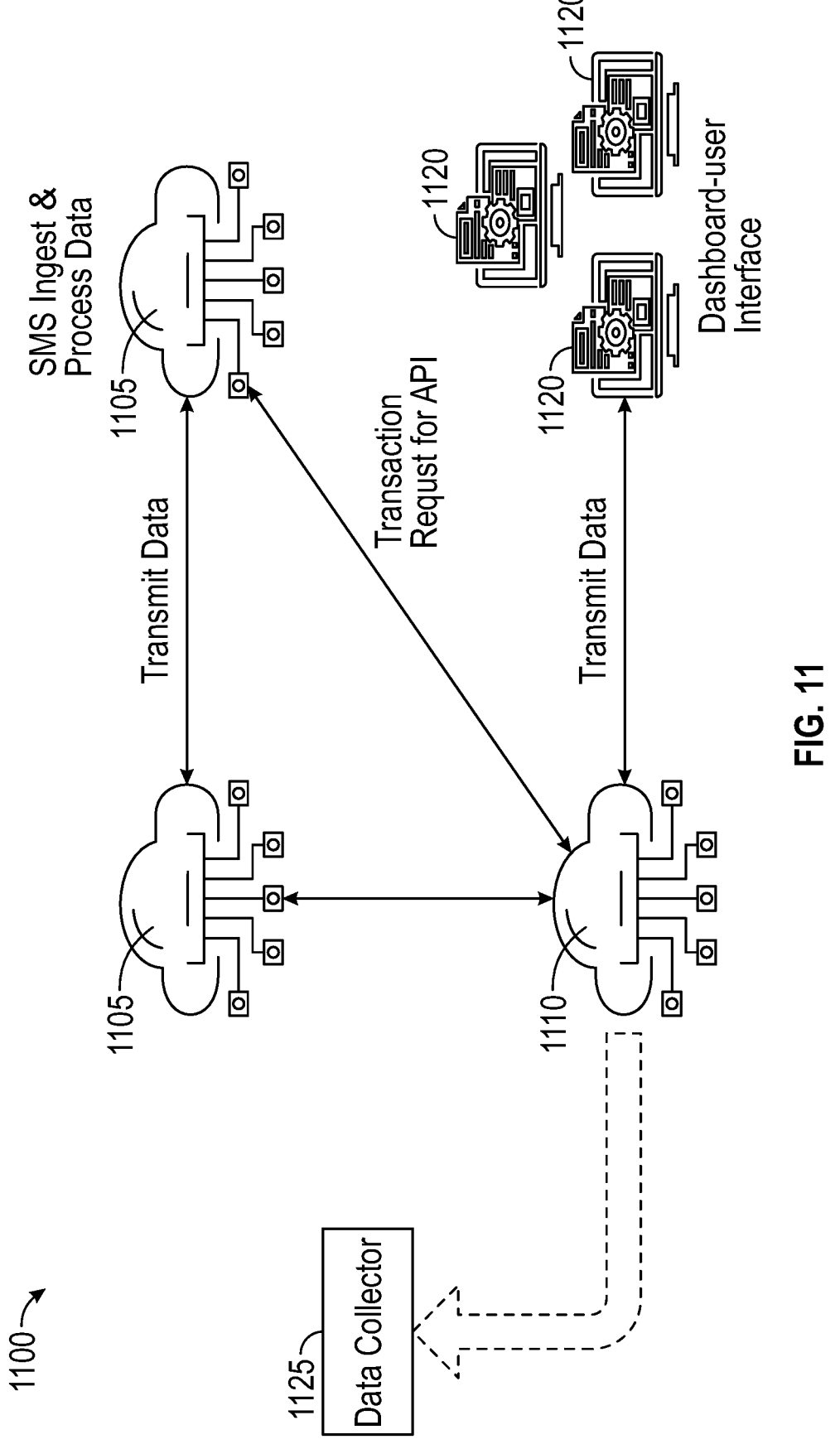
FIG. 11 is a block diagram illustrating data transmission between interconnected devices, according to an exemplary embodiment.

FIG. 11 depicts a block diagram including a system 1100 including a plurality of interconnected devices, according to an exemplary embodiment. The system 1100 may include a plurality of servers (e.g., company server 1105, host server 1110, and messaging server 1115) and a plurality of dashboards (e.g., dashboards 1120). The dashboards 1120 may be and/or include the user devices 709. The dashboards 1120 may also be user interfaces and the user interfaces may be displayed via the user devices 709. At least one of the company server 1105, the host server 1110, and/or the messaging serving may be and/or include the server 705. Similarly, at least one of the company server 1105, the host server 1110, and/or the messaging serving may include components similar to that of the server 705. Additionally, at least one of the company server 1105, the host server 1110, and/or the messaging serving may perform similar functionality to that of the server 705.

The company server 1105 may be a vehicle hub server (e.g., the company server 1105 receives data from the vehicles 701) and the company server 1105 may transmit data received from the vehicles 701 to at least one of the host server 1110 and/or the messaging server 1115. The host server 1110 may be and/or include third-party application system 805. The host server 1110 may receive, from the messaging server 1115, API calls and the host server 1110 may, responsive to receiving the API calls, communicate with the company server 1105. The host server 1110 may track, monitor, and/or otherwise document the amount of API calls received by the host server 1110. The host server 1110 may invoice, charge, and/or otherwise seek reimbursement from the dashboards 1120.

Figure 12:
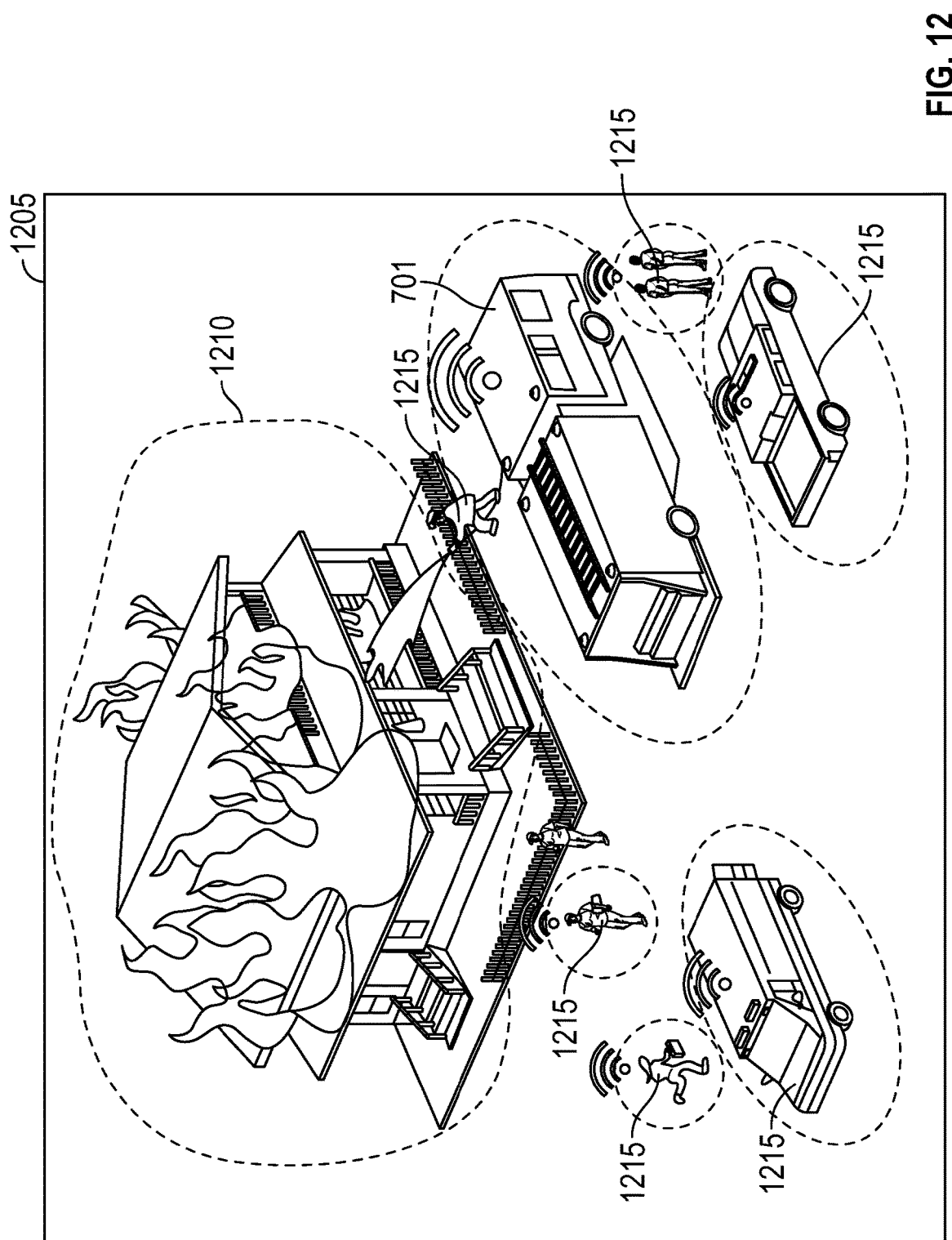
FIG. 12 is a user interface including a graphical representation of a location proximate to an incident, according to an exemplary embodiment.

FIG. 12 depicts a user interface 1200 including a graphical representation of a location 1205 proximate to an incident 1210, according to an exemplary embodiment. The user interface 1200 may be generated by at least one of the incident management system 710 and/or the server 705. The user interface may be displayed, produced, and/or otherwise shown by at least one of the display device 755 and/or the user device 709. The user interface 1200 may be generated using the information received from at least one of the communication devices 707 and/or the sensors 751. For example, the incident management system 710 may receive video data from the communication devices 707 and the incident management system 710 may use the video data to create the graphical representation of the location 1205 proximate to the incident 1210.

While FIG. 12 depicts the incident 1210 as being a fire, the incident 1210 may be and/or include multiple similar and/or different incidents. For example, the incident 1210 may include a building collapse, an earthquake, an active shooter, a hurricane, a flood, a vehicle crash, a snow storm, and/or among other possible incidents. The graphical representation of the location 1205 proximate to the location 1205 may be modified, altered, changed, and/or otherwise updated as additional information is provided to the incident management system 710 and/or the server 705

The graphical representation of the location 1205 proximate to the incident 1210 may include at least one graphical representation of at least one data source 1215. The data sources 1215 may be and/or include the data sources described herein. For example, the data sources 1215 may be the plurality of second vehicles 701. The data sources 1215 may also communicate with the communication devices 707 and the communication devices 707 may transmit the data, received from the data sources 1215, to vehicle 701. While FIG. 12 depicts examples of the data sources 1215 being ambulances, police vehicles, EMTs, firefighters, and police officers, the data sources 1215 may also be components of the vehicles shown in FIG. 12, pieces of equipment associated with the vehicles shown in FIG. 12, and/or pieces of equipment associated with the people illustrated in FIG. 12. The people illustrated in FIG. 12 may be and/or include the occupants of the plurality of second vehicles 701 described herein.

Data Sharing Between Interoperable Agencies

Referring to FIG. 7A, in some embodiments, the system 700 includes vehicles, individuals, and/or equipment belonging to multiple interoperable agencies. Examples of such agencies include but are not limited to fire and rescue, police (e.g., local police departments, federal law enforcement such as DEA, FBI, NSA, DNR, National Park Services, etc.), medical services, and military (e.g., army, navy, air force, marines, coast guard, military police, etc.). The agency may be defined by intended function. By way of example, a military branch may include a fighting group (e.g., a first agency), a medical group (e.g., a second agency), and a military police group (e.g., a third agency). Additionally or alternatively, the vehicles may be managed (e.g., maintained) by one or more agencies acting as service providers (e.g., third party service providers such as the vehicle manufacturer, a maintenance service, or other organizations involved with fleet management).

These agencies may work together when responding to an incident at a scene. However, the agencies may each perform a different function as part of the combined response effort. By way of example, fire and rescue (e.g., fire department) may be tasked with identifying and extinguishing fires, preventing new fires from forming, and extrication of civilians (e.g., patients, individuals involved in a car crash, individuals trapped in a burning building, individuals trapped in a building collapse, etc.) from the incident. By way of another example, law enforcement (e.g., a police department) may be tasked with identifying and apprehending criminals and managing traffic flow. By way of another example, medical services or healthcare providers (e.g., EMTs associated with one or more hospitals) may be tasked with identifying civilians (e.g., injured individuals), classifying the injuries sustained by the civilians, treating the injuries, and transporting the civilians offsite (e.g., to a hospital) for continued treatment. Service providers may have limited interaction with the system 700 while responding to an incident, but may utilize data gathered during the operation to determine what maintenance is necessary for the vehicles. Accordingly, each agency may utilize different personnel, vehicles, and equipment, may generate different types of data, and may require access to different types of data. The system 700 may be configured to employ differing methods of categorizing and distributing data for each agency to accommodate the differing needs of each agency. By way of example, the system 700 may provide relevant data to an agency, may restrict an agency's access to certain data, may provide notifications to an agency in response to predefined circumstances, and/or may present information in certain ways.

When setting up the system 700, each agency is individually integrated into the system 700. Vehicles of the agency may be provided with processing circuits 712 and/or communication devices 707. Each agency may be provided with a series of communication devices 707, harnesses to attach the communication devices 707 to agency personnel or other individuals, and mounts to attach the communication devices 707 to vehicles or equipment. Each processing circuit 712 and communication device 707 may be configured to communicate with the network 703, thereby permitting the vehicles 701 and the communication devices 707 to communicate with the incident management system 710. Accordingly, by providing an agency with one or more communication devices 707, new agencies, vehicles, individuals, and/or equipment can be quickly and easily added into the system. This may be useful when an agency wishes to expand or when an agency wishes to be adopted into a system that already incorporates one or more agencies (e.g., a fire department may utilize a system 700, and a medical service would like to benefit from access to data from the system 700).

Each vehicle 701 and communication device 707 may be registered with the incident management system 710 and assigned one or more identifiers. By way of example, each vehicle 701 and communication device 707 may be assigned an agency identifier associated with the corresponding agency. Each vehicle 701 may be assigned a vehicle identifier. Each communication device 707 may be assigned a vehicle identifier if the communication device 707 is associated with a vehicle, may be assigned a component identifier if the communication device 707 is associated with a specific component, may be assigned an individual identifier if the communication device 707 is associated with a specific individual, and may be assigned an equipment identifier if the communication device 707 is associated with a specific piece of equipment. In some situations, a communication device 707 may be assigned multiple identifiers. By way of example, a communication device 707 attached to an oxygen tank may be assigned an equipment identifier associated with an oxygen tank, an individual identifier associated with a firefighter that carries the oxygen tank, and a vehicle identifier associated with a firetruck where the oxygen tank is stored when not in use.

In some embodiments, the identifiers associated with a specific vehicle 701 or connection device 707 control whether or not the vehicle 701 or connection device 707 is permitted to connect to a network 703. By way of example, when a first device (e.g., vehicle 701) comes within communication range of another device (e.g., a communication device 707) of the system 700, the first device may automatically attempt to connect with the second device to join or create the network 703. The first device, the second device, and/or another component of the network 703 may request the identifiers associated with the other device (e.g., from that device, from the server 705, from the incident management system 710, etc.). The devices may each store a list of acceptable identifiers for communication. By way of example, devices from the same agency may be instructed to automatically connect with one another. If both devices accept the identifiers of the other device, the devices connect automatically. If one of the devices does not accept the connection, the connection is not formed. In such an instance, a device may be manually added to the network 703 by a user with sufficient permissions (e.g., though a user device 709).

After the vehicles 701 and communication devices 707 have been registered and assigned identifiers, each agency, vehicle, component, individual, and/or piece of equipment may be assigned a data policy that provides identifying information about the agency, vehicle, component, individual, and/or piece of equipment and governs how information is provided to the agency, vehicle, component, individual, and/or piece of equipment. The data policy may be generated by or provided to the server 705 and/or the incident management system 710.

Described herein are various data policies at the agency level. The data policies may identify a name of an agency, a category of the agency (e.g., fire and rescue, law enforcement, medical, etc.), and an organization associated with the agency (e.g., a municipality such as a city, state, town, county, township, country, etc. or private company). It should be understood that similar data policies may be assigned at the vehicle level, the equipment level, the individual level, and/or the component level, and such data policies may be utilized in similar ways. Accordingly, any description herein with respect to an agency-level data policy may also apply to such other data policies.

An agency-level data policy may include a predefined list of personnel associated with the agency. The list may include identifying information for each individual (e.g., name, height, weight, job title, rank, etc.). The list may also include an individual data policy for each individual. Similar to the data policies at the agency level, individual data policies may govern how information is provided to the individual. By way of example, the individual data policies dictate what information that individual can access, what notifications are provided to that individual, and how information is presented to the individual.

The data policy may include a charge designation for the agency. The charge designation may be either primary or secondary. An agency with a primary charge designation is considered to be "in charge" at the incident, and may have command privileges (e.g., the ability to command other agencies) and/or access to certain information that is not available to agencies with secondary designations. An agency with a secondary designation is considered to follow the leadership of the primary agency or agencies. In some embodiments, fire and rescue agencies are assigned primary charge designations by default. In other embodiments, the primary designation is determined at each scene. In some such embodiments, the primary designation is determined based on predefined criteria (e.g., the first agency to arrive at the scene is primary, the agency with the largest number of vehicles or personnel present at the scene is primary, etc.).

The data policy may govern what information can be accessed by each agency (e.g., which identifiers correspond to information that the agency is permitted to access). Some agencies may have access to all of the information available within the system, whereas some agencies may have access to only a subset of the information. In some embodiments, there is common subset of information that can be accessed by every agency. In some embodiments, each agency is provided with access to a subset of information specific to that agency or category of agency. Limiting access of agencies to certain information may be beneficial to maintaining data privacy (e.g., limiting the spread of confidential patient information). Limiting access may also prevent an individual associated with an agency from being overwhelmed with information that is irrelevant to their role at the scene.

The data policy may govern what circumstances result in generation of a notification to one or more individuals within an agency, as well as the content of the notification. Accordingly, the notifications can be tuned to be relevant to a given agency, and irrelevant notifications can be avoided. Some notifications may be provided to all agencies (e.g., notifications indicating incident information, such as the location of the incident, notifications indicating the discovery of a civilian in critical condition, etc.). Some notifications are only provided to certain agencies. Accordingly, each data policy may identify both (a) the common notifications and (b) the notifications specific to each agency.

In some embodiments, the notifications include incident information (e.g., a location of an incident, a type of incident such as fire, earthquake, car accident, etc., a type of agency required to respond to the incident, a size of the incident, an amount of resources required to respond to the incident, etc.). The incident information may also include an indication of which areas of the scene have been investigated and/or cleared (e.g., confirmed to not have any active fires, confirmed to not contain any civilians or personnel, etc.). Such notifications may be generated in response to identification of an incident or assignment of an agency to that incident.

In some embodiments, the notifications include personnel locations and statuses. Personnel locations may include locations on the scene or within a building, a location onboard a specific vehicle, or other locations. Personnel statuses may include biometric data (e.g., from one of the sensors 791) or an indication that the individual is incapacitated or otherwise harmed (e.g., based on biometric data). Personnel statuses may include a current task assigned to an individual (e.g., clear a specific section of a building, moving a civilian from the scene to an ambulance, managing traffic flow around the scene, etc.), or other status data. Notifications regarding personnel locations and/or statuses may be generated in response to a determination that an individual has been incapacitated (e.g., to warn firefighters and medical personnel that a firefighter is in need of medical assistance, to warn other police officers that one has been wounded, etc.), or in response to a request from an individual (e.g., a firefighter pressing a panic button indicating that they require assistance from other personnel, etc.).

In some embodiments, the notifications include civilian locations and statuses. Civilian locations may include locations on the scene or within a building, a location onboard a specific vehicle (e.g., an ambulance), or other locations. Civilian statuses may include biometric data (e.g., from one of the sensors 791) or an indication that the individual is incapacitated or otherwise harmed (e.g., based on biometric data). Notifications regarding civilian locations and/or statuses may be generated in response to discovery of a civilian at a scene, a determination that a civilian has been incapacitated (e.g., to warn medical personnel that medical attention will be necessary, etc.), or in response to a determination that a civilian is leaving a scene (e.g., in an ambulance).

In some embodiments, the notifications include vehicle and equipment locations and statuses. Vehicle and equipment locations and status may include locations on the scene or within a building, a location onboard a specific vehicle, or other locations. Vehicle and equipment statuses may include statuses of individual components (e.g., ladder positions, lights on/off, fill levels, etc.), an operational status (e.g., nominal, indication of a fault, indication of specific maintenance necessary, etc.) or an assignment status (e.g., a vehicle 701 is assigned as a pumper for this area, a police vehicle is positioned ahead of an accident to warn oncoming traffic, etc.). Notifications regarding vehicle and equipment locations and/or statuses may be generated in response to a determination that a vehicle or piece of equipment has been incapacitated (e.g., to warn personnel that it is no longer usable, etc.), or in response to a request from an individual (e.g., a police officer broadcasts the location of a police vehicle to other police officers, etc.).

According to one example, a gurney used to transport incapacitated civilians is outfitted with a connection device 707. The connection device 707 is initially assigned an agency identifier and an equipment identifier. During the response to the incident, a medical professional loads an incapacitated civilian onto the gurney, and indicates (e.g., through a user device 709, through a user interface on the connection device 707) that the civilian is present on the gurney. In response, the incident management system 710 assigns a civilian identifier to the connection device 707. Sensors (e.g., of the connection device 707 or a vehicle 701) determine that the gurney is loaded onto an ambulance, and that the ambulance leaves the scene to transport the civilian to Hospital A. In response, the incident management system 710 sends a notification to all medical personnel indicating that the destination of the civilian is Hospital A.

The data policy may govern how information is presented to a user associated with an agency. By way of example, each agency may be assigned different tasks that require access to different information, or that place a different emphasis on certain information. Data from the system 700 may be reviewed by system personnel on a graphical user interface (GUI) provided by a user device 709 (e.g., using an application or web browser on the user device 709). Each user device 709 may be associated with an agency identifier (e.g., based on which user is logged into the user device 709). The data policy may dictate what information is shown on the GUI or how the information is laid out (e.g., what user interface elements are present, the relative positions or sizes of different elements, etc.) based on the agency identifier associated with the user device 709.

According to one example, the user device 709 provides a GUI showing a layout or map of the scene surrounding an incident. By way of example, the GUI may be or utilize the user interface 1200 shown in FIG. 12. In other embodiments, the GUI provides an augmented reality GUI that overlays elements atop a live view of the scene based on information from a camera of the user device 709. The user device 709 may augment the graphical user interface with various information. As shown in FIG. 12, the user device 709 may display the positions of various vehicles, components, equipment, personnel, civilians, etc. overlaid onto the emergency scene. These positions may be determined using sensors of the system 700, as described herein. This facilitates efficiently determining the layout of the system 700 at the scene, which may be useful for coordinating the response to the incident. Various other status information may be included, such as the current vital signs of personnel and civilians, or the status of each vehicle 701 (e.g., the amount of water and foam onboard a vehicle 701, which vehicles 701 are currently pumping, etc.). Based on the agency identifier associated with the user device 709, certain information may be added or removed from the GUI. By way of example, a firefighter may be able to view the locations of all personnel, vehicles, components, and equipment, whereas a police officer may only be able to view the locations of other law enforcement resources.

Table 1 below illustrates a non-limiting example of three possible data policies, each assigned to a different agency. Agency 1 is a fire department with a primary charge designation. Because of this designation, Agency 1 personnel are able to access all available information within the system 700. Agency 1 personnel are provided with a subset of notifications that are most relevant to a fire and rescue agency, such as notifications providing incident information, notifications providing personnel and civilian locations and statuses, and notifications when an area of a scene is cleared. Agencies 2 and 3 are law enforcement and medical agencies, respectively, and are both provided with a secondary charge designation. Because of this designation, the information available to Agency 2 and 3 personnel is limited to common information and information specific to the respective agency. Agency 2 personnel are provided with notifications that are most relevant to law enforcement, such as notifications providing incident information and personnel and civilian locations and statuses. Agency 3 personnel are provided with notifications that are most relevant to medical staff, such as notifications providing incident information, civilian locations and statuses, and ambulance statuses and locations.

TABLE 1

|  | Agency 1 | Agency 2 | Agency 3 |
| --- | --- | --- | --- |
| Name | Fire Department A | Police Department B | Medical Service C |
| Category | Fire and Rescue | Law Enforcement | Medical |
| Organization | Town A | City B | Hospital C |
| Personnel | List A | List B | List C |
| Charge Designation | Primary | Secondary | Secondary |
| Accessible Information | All | Common, Law Enforcement Specific | Common, Medical Specific |
| Notifications | Incident Information, Personnel Locations and Statuses, Cleared Areas, Civilian Locations and Statuses | Incident Information, Personnel Locations and Statuses, Civilian Locations and Statuses | Incident Information, Civilian Locations and Statuses, Ambulance Statuses and Locations |
| Presentation | GUI A | GUI B | GUI C |

Coordinated Pumping

Figures 13, 14:
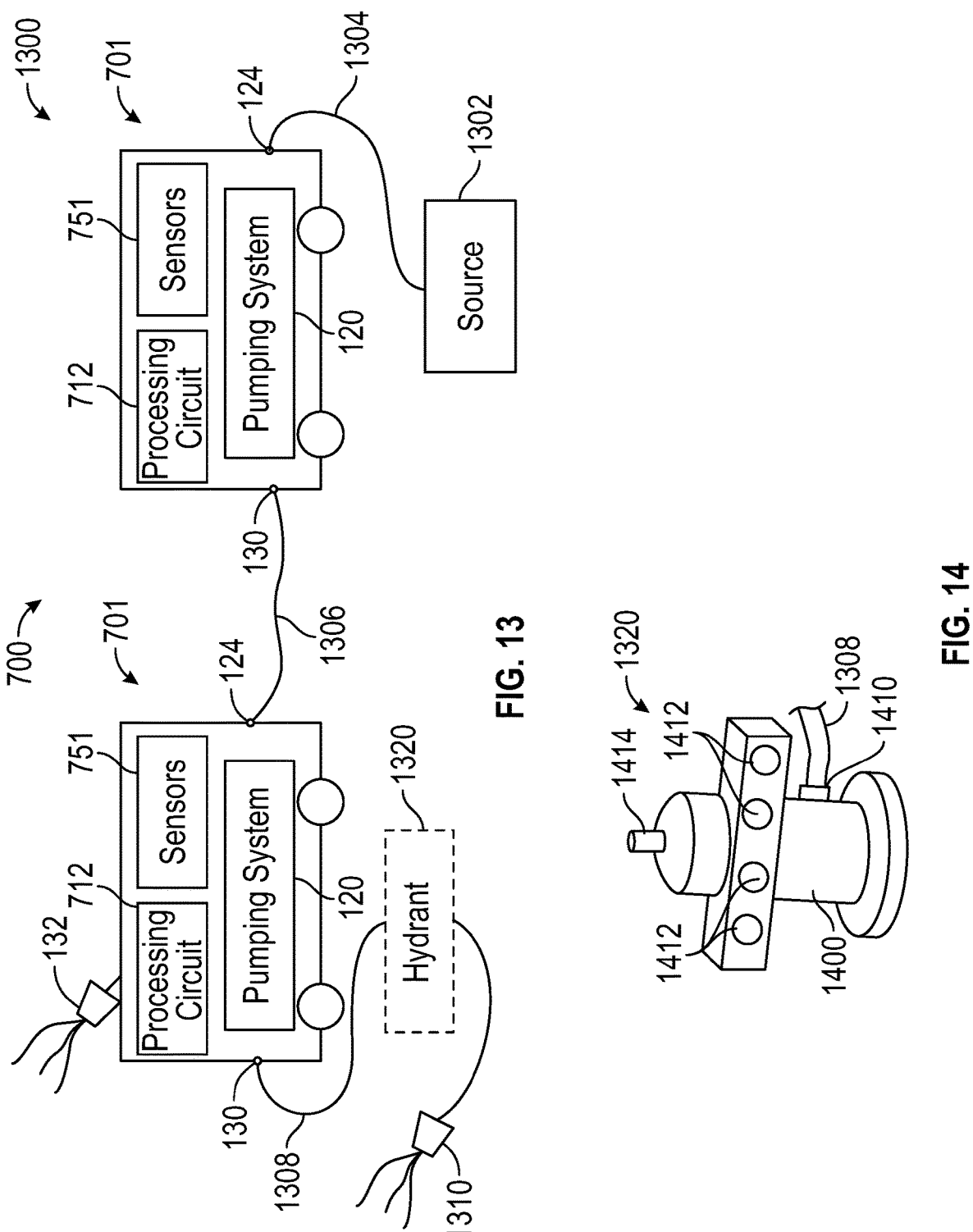
FIG. 13 is a schematic view of a pumping system including two response vehicles operating in series, according to an exemplary embodiment.
FIG. 14 is a perspective view of a hydrant of the pumping system of FIG. 13, according to an exemplary embodiment.

Referring to FIGS. 1 and 13, the system 700 may coordinate operation of two or more vehicles 701. Specifically, FIG. 13 shows a pair of vehicles 701 operating as a pumping system 1300 according to an exemplary embodiment. In the pumping system 1300, the system 700 utilizes the processing circuits 712 to coordinate operation of the vehicles 701 to provide a flow of fluid (e.g., water). The vehicles 701 operate in a series arrangement to move fluid from a low pressure source (e.g., a lake, a river, a pond, a tank 126, etc.), shown as source 1302 to spray a hazard, such as a fire. A first vehicle 701 draws the fluid from the source 1302 and delivers the fluid to the second vehicle 701. The second vehicle 701 elevates the pressure of the fluid and delivers the high pressure fluid to a nozzle to generate a spray of fluid.

As shown in FIG. 13, an inlet 124 of the first vehicle 701 is fluidly coupled to the source 1302 by a first conduit, shown as hose 1304. The pumping system 120 of the first vehicle 701 draws the fluid from the source 1302 through the hose 1304 to the inlet 124 at a first inlet pressure. The pumping system 120 delivers the fluid to an outlet 130 of the first vehicle 701 at a first outlet pressure and first flow rate. The first outlet pressure may be greater than the first inlet pressure. The outlet 130 of the first vehicle 701 is fluidly coupled to an inlet 124 of the second vehicle 701 by a second conduit, shown as hose 1306. The pumping system 120 of the second vehicle 701 receives the fluid through the inlet 124 at a second inlet pressure. The pumping system 120 delivers the fluid to an outlet 130 of the second vehicle 701 at a second outlet pressure and second flow rate. The second outlet pressure may be greater than the second inlet pressure. In some embodiments, the first flow rate and the second flow rate are substantially equal. In some embodiments, the fluid at the second outlet pressure is delivered from the monitor 132. Additionally or alternatively, a third conduit, shown as hose 1308, fluidly couples the outlet 130 to a handheld nozzle, shown as handline nozzle 1310. The handline nozzle 1310 may be hand portable and supported by an operator (e.g., a firefighter). In some embodiments, an inline manifold or portable hydrant, shown as hydrant 1320, is positioned along the hose 1308.

To operate efficiently, the pumping systems 120 of each vehicle 701 require fluid to be delivered to the respective inlets 124 under certain operating conditions (e.g., at a desired pressure, within a desired range of pressures, at a desired flow rate, within a desired range of flow rates, etc.). These operating conditions may change throughout operation of the system 1300. By way of example, a desired flow rate and a desired pressure of the second pumping system 120 may increase as an operator increases fluid demand (e.g., opens the handline nozzle 1310 to spray water at a greater flowrate). Accordingly, it is desirable to vary the output of the pumping system 120 of the first vehicle 701 to account for changes in suppressant demand in order to avoid overloading or starving the pumping system 120 of the second vehicle 701.

To accomplish this, the system 700 utilizes data gathered by the system 700 to coordinate operation of the vehicles 701 while performing series pumping. By way of example, the system 700 may use data from one vehicle 701 to control another vehicle 701. The sensors 751 may measure the first inlet pressure, the first outlet pressure, the first flow rate, the second inlet pressure, the second outlet pressure, and/or the second flow rate and provide corresponding sensor data. Based on provided control signals, the system 700 (e.g., the processing circuits 712 of the vehicles 701) may monitor the operation of the pumping systems 120 and determine a load level of each pump 122 (e.g., an operating speed of the pump 122, a power being delivered by a motor of the pump 122, etc.).

Using the collected data, the system 700 may determine a command for each pump 122. In one embodiment, the sensor data is used to determine the second outlet pressure. The system 700 may control the second pumping system 120 to maintain the second outlet pressure at a target outlet pressure. Such control may facilitate providing sufficient flow to meet fluid demand and reducing the amount of fluid supplied if fluid demand decreases.

The system 700 may control the pumping system 120 of the first vehicle 701 to meet the demand of the pumping system 120 of the second vehicle 701. By utilizing sensor data, the system 700 may execute closed loop control and operate as desired independent of external conditions (e.g., variations in length of the hose 1306, differences in elevation between the vehicles 701, etc.). By way of example, the system 700 may use the sensor data to determine the second flow rate and control the pumping system 120 of the first vehicle 701 to maintain the first flow rate equal to the second flow rate. By way of another example, the system 700 may use the sensor data to determine the second inlet pressure and control the pumping system 120 to maintain the second inlet pressure within a desired pressure range (e.g., increasing the speed of the pump 122 of the first vehicle 701 in response to the second inlet pressure falling below a desired pressure).

FIG. 14 illustrates the hydrant 1320 according to an exemplary embodiment. The hydrant 1320 includes a chassis, shown as body 1400, that forms the structure of the hydrant 1320. The body 1400 includes a base 1402 that engages the ground and supports the body 1400. In some embodiments, the body 1400 is removable from the ground such that the hydrant 1320 is portable. By way of example, the hydrant 1320 may be stored onboard a vehicle 701 and deployed when the vehicle 701 reaches a scene of an incident. The portability of the hydrant 1320 may facilitate quickly and easily connecting one or more nozzles to the pumping system 1300 while responding to the incident.

The hydrant 1320 defines one or more interfaces, shown as inlet 1410 and outlets 1412. The inlet 1410 may be selectively fluidly coupled to the outlet 130 of the second vehicle 701 by the house 1308. The outlets 1412 may each be fluidly coupled to a handline nozzle 1310 by another hose (e.g., a handline). The hydrant 1320 may act as a manifold to distribute fluid from the hose 1308 to multiple handline nozzles 1310. Accordingly, the hydrant 1320 may facilitate scaling the pumping system 1300 to include a desired quantity of handline nozzles 1310 based on the requirements of the scene.

In some embodiments, the hydrant 1320 includes a flow control device, shown as valve 1414. The valve 1414 may selectively restrict flow between the inlet 1410 and the outlets 1412. By way of example, the valve 1414 may be used to fluidly decouple the inlet 1410 from one or more of the outlets 1412 (e.g., when the handline nozzles 1310 are not in use).

By controlling the second pumping system 120 to maintain the second outlet pressure at a target outlet pressure, the pumping system 1300 may automatically adjust operation for any number of active handline nozzles 1310. By way of example, activating additional handline nozzles 1310 may increase fluid demand and result in a corresponding decrease in the second outlet pressure. The system 700 may detect the decrease and respond by increasing the speeds of the pumps 122. Increasing the speeds of the pumps 122 increases the second outlet pressure and meets the added demand of the handline nozzles 1310.

In other embodiments, the pumping system 1300 is otherwise arranged. By way of example, the pumping system 1300 may include three or more vehicles 701 in series. Such an arrangement may be used when the fluid is transferred over a large distance or when a large flowrate is desired.

By way of another example, the pumping system 1300 may include two or more upstream vehicles 701 supplying fluid to the same downstream vehicle 701. In such an embodiment, the upstream vehicles 701 each supply a portion of the fluid required by the downstream vehicle 701. The upstream vehicles 701 may receive fluid from the same source 1302 or from different sources 1302. The system 700 may control the upstream vehicles 701 to collectively meet the desired flow rate and the desired pressure at the inlet 124 of the downstream vehicle 701. In this configuration, the downstream vehicle 701 may be fluidly coupled to the upstream vehicles 701 by a hydrant 1320. In some such embodiments, the valve 1414 is actively controlled by the system 700 to control the relative amounts of fluid being supplied by the upstream vehicles 701.

By way of another example, the pumping system 1300 may include two or more downstream vehicles 701 that are supplied with fluid by the same upstream vehicle 701. In such an embodiment, the downstream vehicles 701 may each receive at least a portion of their required fluid from the upstream vehicle 701. The system 700 may control the upstream vehicle 701 to meet the desired flow rate and the desired pressure at the inlets 124 of the downstream vehicles 701. In this configuration, the downstream vehicles 701 may be fluidly coupled to the upstream vehicle 701 by a hydrant 1320. In some such embodiments, the valve 1414 is actively controlled by the system 700 to control the relative amounts of fluid being supplied to the downstream vehicles 701.

Variable-Frequency Data Reporting

In order to facilitate maintenance of a vehicle or piece of equipment, it may be advantageous to communicate data regarding the status of the vehicle or piece of equipment to one or more users. By way of example, when troubleshooting an issue with a vehicle (e.g., poor performance, an inoperable vehicle subsystem, etc.), a user (e.g., a member of maintenance personnel) may view recent sensor data relating to operation of the vehicle. By reviewing the sensor data, the user may be able to recognize data trends that indicate potential sources of the issue and/or potential solutions to the issue.

In some embodiments, data is transmitted from a data source (e.g., a vehicle or piece of equipment) to a remote database (e.g., on a server), where the data is stored for later review by a user. In response to a user request, the server may then provide the data to a user device for display and review by the user. By way of example, a user may submit a user request to review the data stored within the remote database. In response, the remote database may provide a command to generate a GUI on the user device or otherwise present the data for inspection by a user.

For ease of description, the data source will be referred to as a vehicle 701, the remote database will be referred to as the server 705, and the user device will be referred to as the user device 709. However, it should be understood that the data source may be any data source (e.g., a vehicle 701, a communication device 707, a user device 709, the offsite devices 794, etc.). The process of transmitting data may be managed (e.g., controlled, executed, etc.) by the vehicle manager 735 or any other controller of the system. The remote database may be any device capable of storing and transmitting data (e.g., a cloud device, a server, a database onboard another vehicle, etc.). The user device may be any device capable of providing information to a user. By way of example, information may be transferred to a user device 709 through the client portal 810 and/or the third-party application system 805. Collectively, the data source, the remote database, and the user device may be part of an asset management system or fleet management system.

The vehicle 701 may have a large number of data sources available (e.g., a large number of sensors 751). While access to this breadth and variety of information may be advantageous when troubleshooting the vehicle 701, the large amount of data may be difficult (e.g., resource-intensive) to transmit and store effectively. The vehicle 701 address this issue by transmitting data in response to a predefined event. By way of example, the vehicle 701 may transmit data to the server 705 in response to a determination that an ignition of the vehicle 701 has been switched to an "on" position. By way of another example, the vehicle 701 may transmit data to the server 705 in response to a determination that a sensor value has fallen outside of a predetermined range (e.g., an acceptable range). By way of another example, the vehicle 701 may transmit data to the server 705 in response to a component of the vehicle experiencing a fault (e.g., a fault code, an engine code, etc.). The predefined events may be selected based on events that are known to be symptomatic of component failures or other issues with the vehicle 701.

The data transmitted my include data (e.g., sensor data from the sensors 751) captured in proximity to (e.g., immediately before, immediately after, and/or during) the event. Beneficially, sending data captured in proximity to the event may help to limit the user's review to exclusively data that is relevant to the troubleshooting. However, limiting the transmitted data to only data captured in proximity to the event may prevent the user from reviewing data trends that led up to the event or continued after the event. Without this surrounding data, a user may be unable to properly troubleshoot the issue. To complete the troubleshooting, a user may be required to interact directly with the vehicle 701 (e.g., to try and recreate the issue while recording all of the data provided by the sensors). This may require the vehicle 701 to be transported to a shop, introducing a delay and increasing cost.

Additionally, this event-based approach to triggering data recording and transmission is limited to predefined events. If a new issue occurs that does not exhibit any of the predefined events, no data regarding the issue may be captured. By way example, the issue may include an aerial assembly 150 overrunning an intended range of motion and contacting the ground, causing damage to a portion of the ladder. This could be caused, for example, by a failure of a ladder position sensor. If none of the predefined events triggered while this issue occurred, then no data regarding the issue would be recorded.

To overcome these issues with event-based triggering, the vehicle 701 may record and transmit data to the server 705 at regular intervals. In some embodiments, the vehicle 701 records the available data locally at a first interval (e.g., once per second), building a dataset. The vehicle 701 then transmits the locally recorded dataset to the server 705 at a second interval (e.g., once every three minutes) equal to or larger than the first interval. The vehicle 701 may then begin recording a new dataset for subsequent transmission to the server 705. The datasets may be deleted from the local storage to free up additional space (e.g., in response to an indication that the datasets have been successfully transferred to the server 705). The first interval and/or the second interval may be set by a user. In some embodiments, the first interval and/or the second interval vary based on an operating state of the vehicle 701 (e.g., if the vehicle 701 is on or off, based on operation of a specific component, etc.).

Regularly recording and transmitting the data provides a user with high fidelity information and the ability to analyze long-term data trends. However, recording this volume of data (e.g., one data point per sensor per second) requires a large amount of storage space. Additionally, transporting this volume of data may require a large communication bandwidth.

In order to reduce the volume of data recorded and transmitted, the vehicle 701 (e.g., the vehicle manager 735) may intelligently vary the first interval at which data is recorded. Specifically, the vehicle manager 735 individually monitors each item (e.g., signal) of the dataset over time. An item may be sensor data from a specific sensor 751, a specific user setting, the location data, or other types of data. The vehicle manager 735 may record a full set of data points for all of the items at the beginning of a monitoring period (e.g., on startup of the vehicle 701, at the beginning of a new dataset recording period, etc.). The vehicle manager 735 may record a new data point for the item in response to the vehicle manager 735 determining that the item has changed. If the vehicle manager 735 determines that the item has not changed, the vehicle manager 735 may instead rely on the prior-recorded datapoint instead of recording a new one. In this way, the vehicle manager 735 may avoid storing repeated data points, thereby providing a similar high-fidelity dataset with a reduced volume of data. Items that change frequently may utilize a larger volume of data to capture their changes, while items that remain constant may utilize a comparatively small volume of data.

The vehicle manager 735 may determine whether or not an item has changed based on a variety of factors. In some embodiments, the vehicle manager 735 compares the current value of an item (e.g., a current reading or measured value of a sensor 751) to the value of the most recently recorded data point for that item. If the difference (e.g., the magnitude of the difference) between the current value and the most recently recorded data point is greater than a predetermined threshold, the vehicle manager 735 may determine that that item has changed and record a new data point. By way of example, if a speed of the vehicle 701 was previously recorded as being 25 mph, the vehicle manager 735 may determine that a "vehicle speed" item has changed in response to the measured speed falling below 24 mph or exceeding 26 mph. By way of another example, if the location data previously indicated a location of the vehicle 701, the vehicle manager 735 may determine that a "vehicle location" item has changed in response to the measured location of the vehicle 701 being more than 10 feet from the previously-recorded location. If the difference between the current value and the most recently recorded data point is less than the predetermined threshold, the current value may not be recorded.

In some embodiments, the vehicle manager 735 calculates a rate of change (e.g., a derivative) of an item. If the magnitude of the derivative exceeds a predetermined threshold rate of change, the vehicle manager 735 may determine that the item has changed and record a new data point. By way of example, the vehicle manager 735 may record a new data point for a "ladder orientation" item in response to the derivative of an angle of incline of the ladder assembly 154 exceeding 1 degree per second. If the magnitude of the derivative is below the predetermined threshold rate of change, the vehicle manager 735 may determine that the item has not changed and proceed without recording a new data point.

Figure 15:
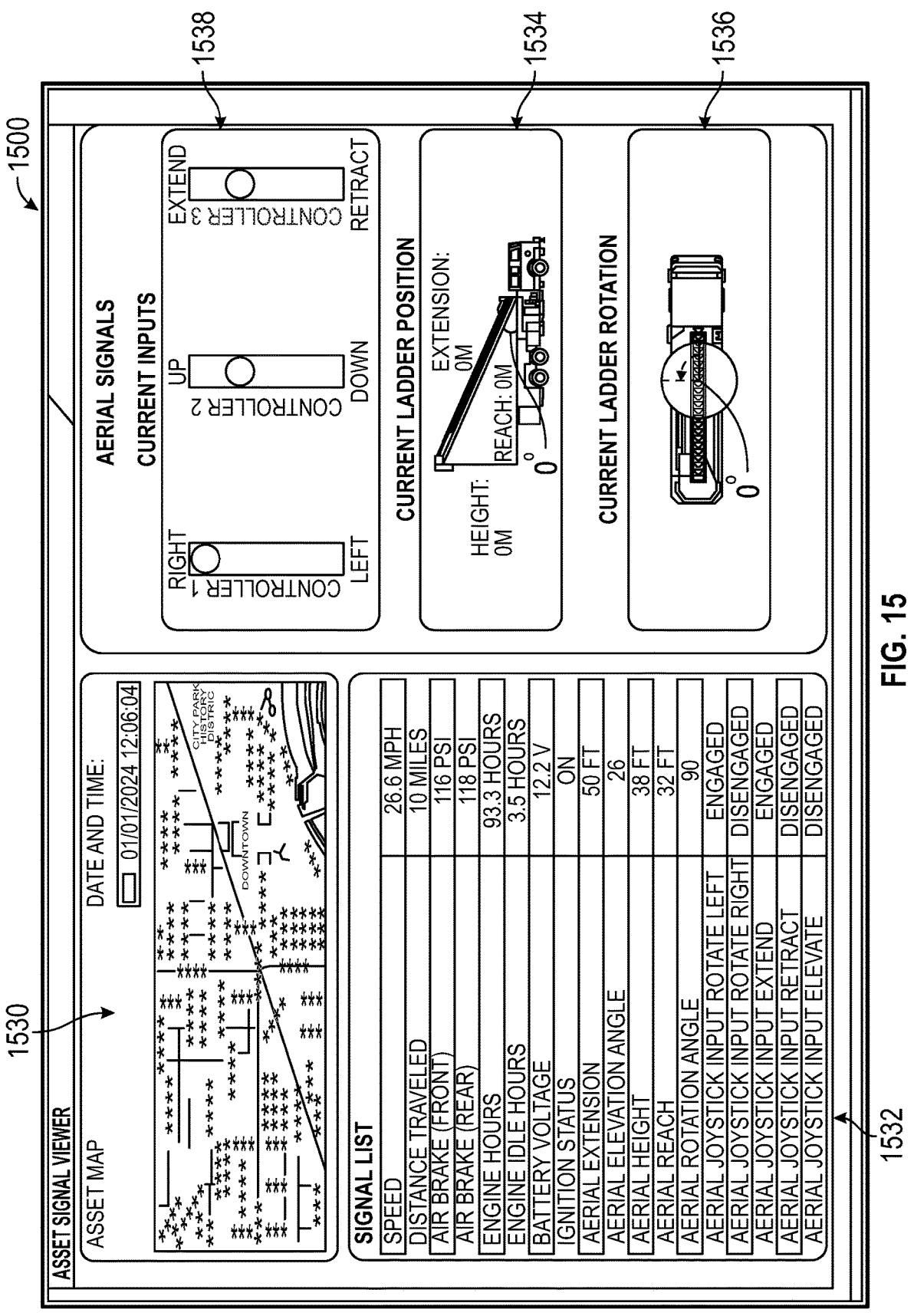
FIGS. 15 and 16 are portions of a graphical user interface of a user device of the system of FIG. 7A, according to an exemplary embodiment.
Figure 16:
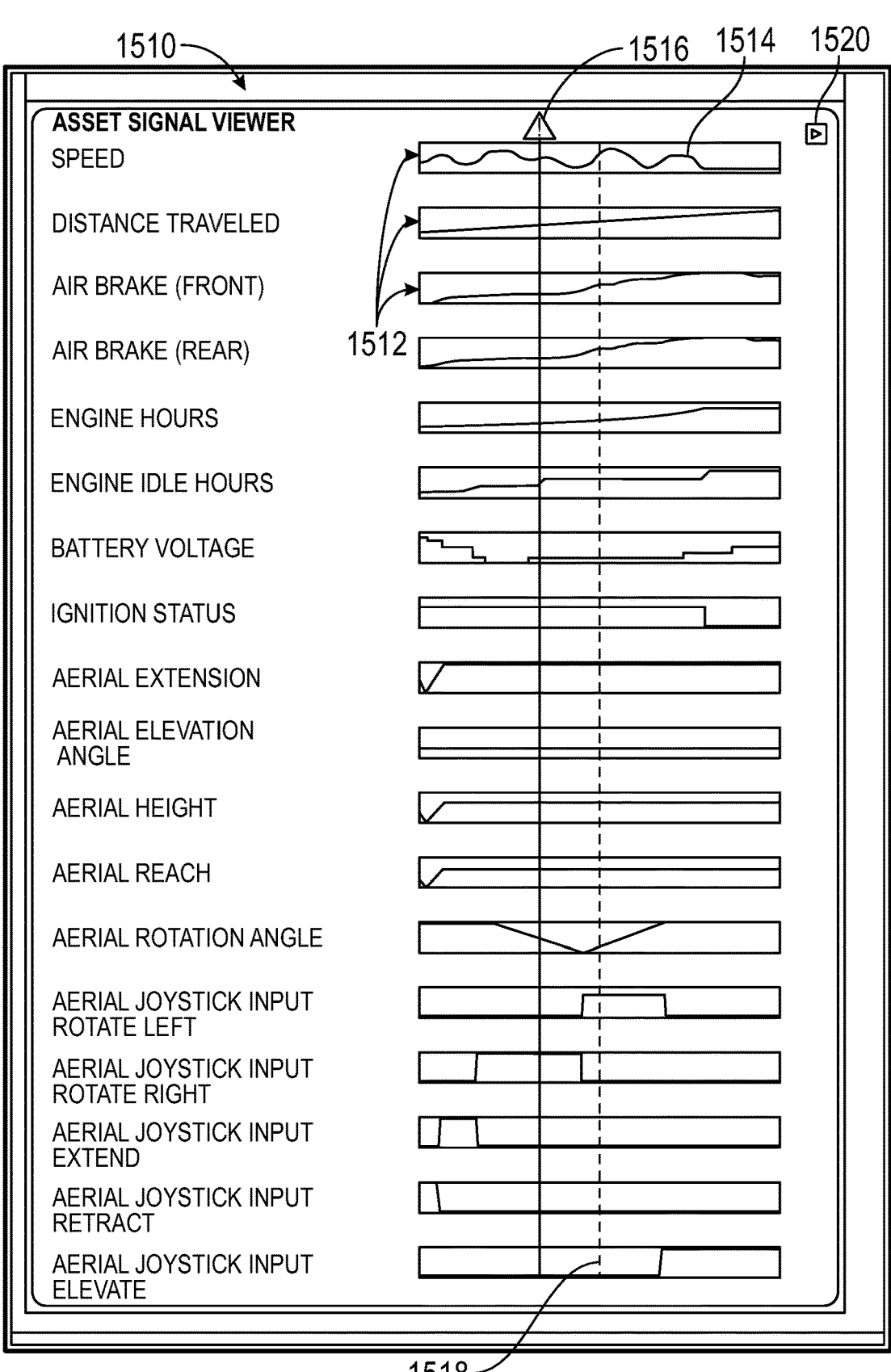

In response to a user request, the system 700 (e.g., the server 705) may generate a GUI for presentation to a user through the user device 709. By way of example, a user request may be a command issued through an application or a navigation to a particular hyperlink in a web browser. Referring to FIGS. 15 and 16, one such example of a GUI is an asset signal viewer, shown as GUI 1500. The GUI 1500 may be presented in a web browser, in an application on a smartphone or tablet, through a user interface of a vehicle 701, or through any other user interface. Although the GUI 1500 is shown in two figures for clarity of illustration, it should be understood that the GUI 1500 may be shown in a single screen or page or split across multiple screens or pages.

The GUI 1500 presents data from the server 705 for examination and analysis by a user. The data presented in the GUI 1500 may represent some or all of the data transmitted to the server 705 by the vehicle 701. The GUI 1500 may permit a user to select a particular vehicle or piece of equipment and show only data relevant to that particular vehicle or piece of equipment.

As shown in FIGS. 15 and 16, the GUI 1500 includes a display element or signal trend portion, shown as trendline portion 1510, that shows the variation in several items over time. The trendline portion 1510 includes a series of display elements, shown as graphs 1512, each expressing a different item of the dataset. Each graph 1512 includes a line, shown as trendline 1514, that visually indicates the value of the corresponding item over time. The graphs 1512 are stacked such that a vertical line can be drawn through all of the graphs 1512 to identify the point of each trendline 1514 at a corresponding time.

A first vertical line indicator, issue indicator, or event indicator, shown as event indicator 1516, intersects each of the trendlines 1514. The event indicator 1516 may represent the time that an event was registered by the vehicle 701. A second vertical line indicator or current selected time indicator, shown as selected time indicator 1518, intersects each of the trendlines 1514. The selected time indicator 1518 may represent a point in time selected by a user. The user may reposition the selected time indicator 1518 to inspect the values of the items at a particular time of interest. By way of example, the user may click or tap a portion of a graph 1512 to select a particular time. By way of another example, the GUI 1500 may include a play button 1520 that, when pressed, causes the selected time indicator 1518 to move forward in time (e.g., at a fixed rate).

The trendline portion 1510 includes a graph 1512 designated as "speed" that represents a travel speed of the vehicle 701 (e.g., expressed in miles per hour). The speed may be measured with a GPS, a wheel speed sensor, or another type of sensor. The trendline portion 1510 includes graph 1512 designated as "distance traveled" portion that represents a distance traveled by the vehicle 701 (e.g., expressed in miles). The distance traveled may be reset for a given trip, or may be measured over the life of the vehicle 701. The distance traveled may be measured with a GPS, a wheel speed sensor, or another type of sensor.

The trendline portion 1510 includes a graph 1512 designated as "air brake (front)" and a graph 1512 designated as "air brake (rear)" that represent an engagement level (e.g., a pressure expressed in psi) of a braking component (e.g., an air brake caliper) on a front axle and a rear axle of the vehicle 701, respectively. The air brake engagement levels may be measured by a pressure sensor, a force sensor, or another type of sensor.

The trendline portion 1510 includes a graph 1512 designated as "engine hours" that represents the total time that a prime mover (e.g., an engine) of the vehicle 701 (e.g., expressed in hours) is actively propelling the vehicle 701. Similarly, trendline portion 1510 includes a graph 1512 designated as "engine idle hours" that represents the total time that a prime mover (e.g., an engine) of the vehicle 701 (e.g., expressed in hours) is idling.

The trendline portion 1510 includes a graph 1512 designated as "battery voltage" that represents a current capacity (e.g., a voltage) of an energy storage device (e.g., a battery) of the vehicle 701. A battery voltage may be measured by a voltage sensor and expressed in volts.

The trendline portion 1510 includes a graph 1512 designated as "ignition status" that represents the current status of an ignition of the vehicle 701. The ignition status may return a first value (e.g., 1) when switched on and a second value (e.g., 0) when switched off.

The trendline portion 1510 includes a graph 1512 designated as "aerial extension" that represents the current extension length of the ladder assembly 154 (e.g., expressed in feet). The aerial extension length may be considered 0 when the ladder assembly 154 is fully retracted. The aerial extension length may be measured by a linear position sensor. The aerial extension length indicates a position of the ladder assembly 154 relative to the chassis 140.

The trendline portion 1510 includes a graph 1512 designated as "aerial elevation angle" that represents an angle between a horizontal reference (e.g., the chassis 140, the ground, a plane perpendicular to the direction of gravity, etc.) and the ladder assembly 154 (e.g., expressed in degrees). The aerial elevation angle may be considered 0 when the ladder assembly 154 is horizontal. The aerial elevation angle may be measured by an inclinometer, gyroscopic sensor, or an angle sensor. The aerial extension angle indicates a position of the ladder assembly 154 relative to the chassis 140.

The trendline portion 1510 includes a graph 1512 designated as "aerial height" that represents a vertical position of a distal end of the aerial assembly 150 (e.g., expressed in feet). The aerial height may be considered 0 when the ladder assembly 154 is horizontal. The trendline portion 1510 includes a graph 1512 designated as "aerial reach" that represents a horizontal position of a distal end of the aerial assembly 150 (e.g., expressed in feet). The aerial reach may be considered 0 when the ladder assembly 154 is fully retracted. The aerial height and aerial reach may be calculated based on the aerial extension and aerial elevation angle. The aerial height and aerial reach each indicate a position of the ladder assembly 154 relative to the chassis 140.

The trendline portion 1510 includes a graph 1512 designated as "aerial rotation angle" that represents an angular orientation of the aerial assembly 150 about a vertical axis (e.g., as controlled by the turntable actuator 160). The aerial rotation angle may be expressed in degrees. The aerial rotation angle may be considered 0 when the ladder assembly 154 extends forward, parallel to the chassis 140. The aerial rotation angle may be measured by a gyroscopic sensor or an angle sensor. The aerial rotation angle indicates a position of the ladder assembly 154 relative to the chassis 140.

The trendline portion 1510 includes graphs 1512 that represent user input commands for the aerial assembly 150 designated as "aerial joystick input rotate left," "aerial joystick input rotate right," "aerial joystick input extend," "aerial joystick input retract," "aerial joystick input," and "aerial joystick input elevate." These commands may be provided by an operator of the vehicle 701 through a user interface of the vehicle 701 (e.g., a joystick). Aerial joystick input rotate left and aerial joystick input rotate right indicate commands for the turntable actuator 160. Aerial joystick input extend and aerial joystick input retract indicate commands for the ladder extension actuator 164. Aerial joystick input elevate indicates a command for the ladder lift actuator 162.

As shown in FIGS. 15 and 16, the GUI 1500 includes a display element or location portion, shown as map 1530. The map 1530 indicates a current location of the vehicle 701. In some embodiments, the map 1530 indicates a path that the vehicle 701 has traveled and/or a projected path for the vehicle 701.

The GUI 1500 includes a display element or current signal portion, shown as signal list 1532, that lists values of a subset of the items. The GUI 1500 includes a display element or current signal portion, shown as ladder position portion 1534, that graphically illustrates the extension, elevation angle, height, and reach of the ladder assembly 154. The GUI 1500 includes a display element or current signal portion, shown as ladder rotation portion 1536, that graphically illustrates the rotation angle of the aerial assembly 150. The GUI 1500 includes a display element or current signal portion, shown as control input portion 1538, that graphically illustrates the user input commands. The signal list 1532, the ladder position portion 1534, the ladder rotation portion 1536, and the control input portion 1538 may each represent the current value for each item or the value at the time selected using the selected time indicator 1518.

Configuration of the Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). By way of example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A vehicle system comprising:
a vehicle including:
a chassis;
a tractive element coupled to the chassis;
a prime mover configured to drive the tractive element to propel the vehicle; and
one or more sensors; and
processing circuitry operatively coupled to the one or more sensors and configured to:
receive, from a first sensor of the one or more sensors, first sensor data relating to operation of the vehicle,
predict a failure of a component of the vehicle based on the first sensor data,
provide a first notification to a user including information describing the predicted failure,
receive a selection of a desired task to be performed by the vehicle,
provide, based on the predicted failure and the selection of the desired task, an indication that the vehicle is not suitable to perform the desired task, and
provide a recommendation of an alternative vehicle that is suitable to perform the desired task.

2. The vehicle system of claim 1, wherein the information describing the predicted failure includes an identification of the component that is predicted to fail and a predicted failure timing.

3. The vehicle system of claim 1, wherein the information describing the predicted failure includes a preventative maintenance process corresponding to the component that is predicted to fail.

4. The vehicle system of claim 1, wherein the processing circuitry is further configured to:
determine a cumulative usage of the component of the vehicle based on the first sensor data; and
predict the failure of the component of the vehicle based on the cumulative usage and a rated operating life of the component.

5. The vehicle system of claim 1, wherein the processing circuitry is further configured to:
identify a change in an operating characteristic of the component of the vehicle based on the first sensor data; and
predict the failure of the component of the vehicle based on the change in the operating characteristic.

6. The vehicle system of claim 1, wherein the processing circuitry is further configured to:

receive, from a second sensor of the one or more sensors, image data regarding a surrounding environment of the vehicle;
identify, using the image data, at least one of an object or an event within the surrounding environment; and
provide a second notification to the user based on the at least one of the object or the event that is identified.

7. The vehicle system of claim 6, wherein the processing circuitry is further configured to:
identify, using the image data, a traffic indicator within the surrounding environment; and
provide the second notification to the user in response to detecting the traffic indicator.

8. The vehicle system of claim 7, wherein the processing circuitry is further configured to:
determine, using the image data, a distance between the traffic indicator and the vehicle; and
provide the second notification to the user in response to detecting the traffic indicator and determining that the distance between the traffic indicator and the vehicle is less than a threshold distance.

9. The vehicle system of claim 8, wherein the processing circuitry is further configured to determine the threshold distance based on a speed of the vehicle.

10. The vehicle system of claim 6, wherein the processing circuitry is further configured to:
identify, using the image data, a fire within the surrounding environment;
determine, based on the image data, a status of the fire; and
provide the second notification to the user in response to detecting the fire, wherein the second notification includes the status of the fire.

11. The vehicle system of claim 6, wherein the processing circuitry is further configured to determine, based on a color included in the image data, a status of the at least one of the object or the event, and wherein the second notification includes the status of the at least one of the object or the event.

12. The vehicle system of claim 1, wherein the processing circuitry includes a first processing circuit onboard the vehicle and a second processing circuit remote from the vehicle.

13. A vehicle system comprising:
a vehicle including:
a chassis;
a tractive element coupled to the chassis;
a prime mover configured to drive the tractive element to propel the vehicle;
a first pump; and
a sensor; and
processing circuitry configured to:
receive, from the sensor, pressure data indicating a pressure of a fluid supplied by the first pump;
determine, based on the pressure data, a command for a second pump of an upstream vehicle where the second pump is fluidly coupled to an inlet of the first pump of the vehicle; and
transmit the command for the second pump to the upstream vehicle.

14. The vehicle system of claim 13, further comprising a portable hydrant fluidly coupled to an outlet of the first pump and configured to direct the fluid supplied by the first pump to a first nozzle and a second nozzle.

15. A vehicle system comprising:
a vehicle including:
a chassis;

a tractive element coupled to the chassis;

a prime mover configured to drive the tractive element to propel the vehicle; and a first pump; and processing circuitry configured to:

receive, from a downstream vehicle, a command to vary a speed of the first pump where the downstream vehicle includes a second pump that is fluid coupled to an outlet of the first pump; and vary the speed of the first pump in response to receiving the command to vary the speed of the first pump.

16. A vehicle system comprising:

a vehicle including:

a chassis;

a tractive element coupled to the chassis;

a prime mover configured to drive the tractive element to propel the vehicle;

a first pump;

a first sensor;

a second sensor; and a third sensor;

processing circuitry configured to:

receive, from the first sensor, first sensor data relating to operation of the vehicle;

predict a failure of a component of the vehicle based on the first sensor data;

provide a first notification to a user including information describing the predicted failure;

receive, from the second sensor, image data regarding a surrounding environment of the vehicle;

identify, using the image data, at least one of an object or an event within the surrounding environment;

provide a second notification to the user based on the at least one of the object or the event that is identified;

receive, from the third sensor, pressure data indicating a pressure of a fluid supplied by the first pump;

determine, based on the pressure data, a command for a second pump of an upstream vehicle where the second pump is fluidly coupled to an inlet of the first pump of the vehicle; and transmit the command for the second pump to the upstream vehicle.

17. A vehicle system comprising:

a first vehicle including:

a first pump having an inlet and an outlet, the first pump being configured to direct fluid from the inlet to the outlet;

a pressure sensor configured to measure a pressure of the fluid; and a first processing circuit operatively coupled to the pressure sensor and the first pump, the first processing circuit configured to transmit a command to increase an amount of the fluid supplied to the inlet in response to a determination that the pressure is below a threshold pressure; and a second vehicle including:

a second pump fluidly coupled to the inlet of the first pump and configured to supply at least a portion of the fluid to the inlet; and a second processing circuit operatively coupled to the second pump, the second processing circuit configured to control the second pump to increase the amount of the fluid supplied to the inlet of the first pump.

18. A vehicle system comprising:

a vehicle;

a first sensor;

a second sensor;

a third sensor; and processing circuitry operatively coupled to the first sensor, the second sensor, and the third sensor, wherein the processing circuitry is configured to:

(a) receive, from the first sensor, first sensor data relating to operation of the vehicle, predict a failure of a component of the vehicle based on the first sensor data, and provide a first notification including information describing the predicted failure;

(b) receive, from the second sensor, image data regarding a surrounding environment of the vehicle, identify, using the image data, at least one of an object or an event within the surrounding environment, and provide a second notification based on the at least one of the object or the event that is identified; and (c) receive, from the third sensor, pressure data indicating a pressure of a fluid supplied by a first pump of the vehicle, determine, based on the pressure data, a command for a second pump of an upstream vehicle where the second pump is fluidly coupled to an inlet of the first pump of the vehicle, and transmit the command to the upstream vehicle.

* * * * *